(12) United States Patent
Kato

(10) Patent No.: US 7,453,784 B2
(45) Date of Patent: Nov. 18, 2008

(54) INFORMATION RECORDING METHOD, INFORMATION RECORDING APPARATUS, AND OPTICAL INFORMATION RECORDING MEDIUM

(75) Inventor: Masaki Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/491,196

(22) Filed: Jul. 24, 2006

(65) Prior Publication Data

US 2006/0256689 A1 Nov. 16, 2006

Related U.S. Application Data

(63) Continuation of application No. 10/424,806, filed on Apr. 29, 2003, now Pat. No. 7,106,680.

(30) Foreign Application Priority Data

May 10, 2002 (JP) ............... 2002-136177
Sep. 12, 2002 (JP) ............... 2002-266501

(51) Int. Cl.
*G11B 7/00* (2006.01)
(52) U.S. Cl. ............... 369/59.11; 369/59.12
(58) Field of Classification Search ............... 369/59.11, 369/59.12
See application file for complete search history.

(56) References Cited

U.S. PATENT DOCUMENTS 4,266,141 A 5/1981 Hirakura et al.
4,369,733 A 1/1983 Hirakura et al.
4,389,972 A 6/1983 Hirakura et al.
4,690,861 A 9/1987 Nakamura et al.

(Continued)

FOREIGN PATENT DOCUMENTS

EP 0 397 238 A1 11/1990

(Continued)

*Primary Examiner*—Wayne Young
*Assistant Examiner*—Linh T Nguyen
(74) *Attorney, Agent, or Firm*—Dickstein Shapiro LLP

(57) ABSTRACT

An information recording technique for forming a recording mark with a multi-pulse sequence, which is increased by one pulse with an irradiation power Pw for every increase of 2T in a temporal length nT of the recording mark is provided. Particularly, this technique realizes a recording strategy that is simple in its configuration but is capable of improving the consistency of mark shapes in forming the recording marks when the value n of the temporal length nT is an odd number. More specifically, when n is an odd number and $n \geq 7$, a period from the fall of a first pulse to the fall of a second pulse is set to 2.5 T and a period corresponding to a last pulse is set to $(2+\delta_1 0)T$ where the value of $\delta_1 0$ is optimized within a range of $0 < \delta_1 0 \leq 1$. In this way, the multi-pulse sequence can be adjusted from the front pulse side and the rear pulse side so that an overall consistency can be realized in the mark shape upon recording the mark. At the same time, when $n \geq 4$, the fall of the first pulse is synchronized with a basic clock, and the fall of the second pulse and the rest of the pulses except for the last pulse are also synchronized with the basic clock by irradiating the pulses at periods of 2.5T or 2T. In this way, the design of a recording strategy generation circuit that generates the actual recording strategy can be simplified.

14 Claims, 17 Drawing Sheets

(a) ACTUAL TIME (b) STANDARDIZED BY T(v)

U.S. PATENT DOCUMENTS

| | | | |
|---|---|---|---|
| 4,797,331 A | 1/1989 | Watada et al. | |
| 4,839,226 A | 6/1989 | Sawada et al. | |
| 5,316,814 A | 5/1994 | Sawada et al. | |
| 5,732,062 A * | 3/1998 | Yokoi et al. | 369/116 |
| 5,848,043 A | 12/1998 | Takada et al. | |
| 6,137,769 A | 10/2000 | Sawada et al. | |
| 6,411,579 B2 * | 6/2002 | Nobukuni et al. | 369/59.12 |
| 6,469,963 B1 | 10/2002 | Sawada et al. | |
| 6,504,806 B1 * | 1/2003 | Nakajo | 369/59.12 |
| 6,529,467 B2 * | 3/2003 | Miyamoto et al. | 369/116 |
| 7,227,818 B1 * | 6/2007 | Toda et al. | 369/44.29 |
| 7,272,095 B2 * | 9/2007 | Shoji et al. | 369/59.12 |
| 7,277,376 B2 * | 10/2007 | Horie et al. | 369/59.1 |
| 2001/0017833 A1 | 8/2001 | Yamada et al. | |
| 2001/0021154 A1 | 9/2001 | Katoh et al. | |
| 2001/0052115 A1 | 12/2001 | Nobukuni et al. | |
| 2001/0053115 A1* | 12/2001 | Nobukuni et al. | 369/59.12 |
| 2002/0021594 A1 | 2/2002 | Nakanura et al. | |
| 2002/0075789 A1 | 6/2002 | Katoh et al. | |
| 2003/0007448 A1 | 1/2003 | Kamezaki et al. | |
| 2003/0026195 A1 | 2/2003 | Kato | |
| 2003/0031108 A1 * | 2/2003 | Furumiya et al. | 369/59.12 |
| 2003/0043712 A1 | 3/2003 | Nakamura et al. | |
| 2003/0044719 A1 | 3/2003 | Katoh et al. | |
| 2003/0048735 A1 | 3/2003 | Sawada et al. | |
| 2003/0090989 A1 | 5/2003 | Sawada et al. | |

FOREIGN PATENT DOCUMENTS

| | | |
|---|---|---|
| EP | 0 978 827 A2 | 2/2000 |
| JP | 08-007277 | 1/1996 |
| JP | 9-7176 | 1/1997 |
| JP | 9-134525 | 5/1997 |
| JP | 9-138947 | 5/1997 |
| JP | 9-219021 | 8/1997 |
| JP | 11-175976 | 7/1999 |
| JP | 2001-101660 | 4/2001 |
| JP | 2001-331936 | 11/2001 |
| JP | 2003-030833 | 1/2003 |
| JP | 2003-242645 | 8/2003 |
| WO | WO 00/72316 A1 | 11/2000 |

* cited by examiner (a) ACTUAL TIME  (b) STANDARDIZED BY T(v)

FIG.14

PARAMETER : Td1

| M2 | M3 | M4 | VALUE |
|----|----|----|-------|
| 0 | 0 | 0 | Td1 = 0.00 |
| 0 | 0 | 1 | Td1 = 0.25 |
| 0 | 1 | 0 | Td1 = 0.38 |
| 0 | 1 | 1 | Td1 = 0.50 |
| 1 | 0 | 0 | Td1 = 0.63 |
| 1 | 0 | 1 | Td1 = 0.75 |
| 1 | 1 | 0 | Td1 = 0.88 |
| 1 | 1 | 1 | Td1 = 1.00 |

PARAMETER : Td2

| M5 | M6 | M7 | VALUE |
|----|----|----|-------|
| 0 | 0 | 0 | Td2/T = −1.00 |
| 0 | 0 | 1 | Td2/T = −0.75 |
| 0 | 1 | 0 | Td2/T = −0.50 |
| 0 | 1 | 1 | Td2/T = −0.25 |
| 1 | 0 | 0 | Td2/T = 0.00 |
| 1 | 0 | 1 | Td2/T = 0.25 |
| 1 | 1 | 0 | Td2/T = 0.50 |
| 1 | 1 | 1 | Td2/T = 1.00 |

PARAMETER : Td2'

| M8 | S2 | S3 | VALUE |
|----|----|----|-------|
| 0 | 0 | 0 | Td2'/T = −1.00 |
| 0 | 0 | 1 | Td2'/T = −0.75 |
| 0 | 1 | 0 | Td2'/T = −0.50 |
| 0 | 1 | 1 | Td2'/T = −0.25 |
| 1 | 0 | 0 | Td2'/T = 0.00 |
| 1 | 0 | 1 | Td2'/T = 0.25 |
| 1 | 1 | 0 | Td2'/T = 0.50 |
| 1 | 1 | 1 | Td2'/T = 1.00 |

PARAMETER : Tmp

| S4 | S5 | S6 | VALUE |
|----|----|----|-------|
| 0 | 0 | 0 | Tmp/T = 0.50 |
| 0 | 0 | 1 | Tmp/T = 0.63 |
| 0 | 1 | 0 | Tmp/T = 0.75 |
| 0 | 1 | 1 | Tmp/T = 0.88 |
| 1 | 0 | 0 | Tmp/T = 1.00 |
| 1 | 0 | 1 | Tmp/T = 1.17 |
| 1 | 1 | 0 | Tmp/T = 1.33 |
| 1 | 1 | 1 | Tmp/T = 1.50 |

PARAMETER : Tmp'

| S7 | S8 | F2 | VALUE |
|----|----|----|-------|
| 0 | 0 | 0 | Tmp'/T = 0.50 |
| 0 | 0 | 1 | Tmp'/T = 0.75 |
| 0 | 1 | 0 | Tmp'/T = 1.00 |
| 0 | 1 | 1 | Tmp'/T = 1.20 |
| 1 | 0 | 0 | Tmp'/T = 1.40 |
| 1 | 0 | 1 | Tmp'/T = 1.60 |
| 1 | 1 | 0 | Tmp'/T = 1.80 |
| 1 | 1 | 1 | Tmp'/T = 2.00 |

| F3 | F4 | F5 | VALUE |
|----|----|----|-------|
| 0 | 0 | 0 | $\delta_{10} = 0.10$ |
| 0 | 0 | 1 | $\delta_{10} = 0.23$ |
| 0 | 1 | 0 | $\delta_{10} = 0.36$ |
| 0 | 1 | 1 | $\delta_{10} = 0.49$ |
| 1 | 0 | 0 | $\delta_{10} = 0.61$ |
| 1 | 0 | 1 | $\delta_{10} = 0.74$ |
| 1 | 1 | 0 | $\delta_{10} = 0.87$ |
| 1 | 1 | 1 | $\delta_{10} = 1.00$ |

| F6 | F7 | F8 | VALUE |
|----|----|----|-------|
| 0 | 0 | 0 | $\delta_2 = 0.00$ |
| 0 | 0 | 1 | $\delta_2 = 0.25$ |
| 0 | 1 | 0 | $\delta_2 = 0.38$ |
| 0 | 1 | 1 | $\delta_2 = 0.50$ |
| 1 | 0 | 0 | $\delta_2 = 0.63$ |
| 1 | 0 | 1 | $\delta_2 = 0.75$ |
| 1 | 1 | 0 | $\delta_2 = 0.88$ |
| 1 | 1 | 1 | $\delta_2 = 1.00$ |

| F3 | F4 | F5 | VALUE |
|----|----|----|-------|
| 0 | 0 | 0 | $\delta_3 = 0.00$ |
| 0 | 0 | 1 | $\delta_3 = 0.07$ |
| 0 | 1 | 0 | $\delta_3 = 0.14$ |
| 0 | 1 | 1 | $\delta_3 = 0.21$ |
| 1 | 0 | 0 | $\delta_3 = 0.28$ |
| 1 | 0 | 1 | $\delta_3 = 0.35$ |
| 1 | 1 | 0 | $\delta_3 = 0.42$ |
| 1 | 1 | 1 | $\delta_3 = 0.50$ |

11h

INFORMATION RECORDING METHOD, INFORMATION RECORDING APPARATUS, AND OPTICAL INFORMATION RECORDING MEDIUM

CROSS REFERENCE TO RELATED APPLICATIONS

The present application is a continuation of U.S. application Ser. No. 10/424,806, filed on Apr. 29, 2003 now U.S. Pat. No. 7,106,680, the disclosure of which is incorporated by reference in its entirety.

BACKGROUND OF THE INVENTION

1. Field of the Invention

The present invention relates generally to an information recording method, an information recording apparatus, and an optical information recording medium. More particularly, the present invention relates to an information recording method suitable for recording information on a phase change optical information recording medium such as a CD-RW, a DVD-RAM, a DVD-RW, or a DVD+RW using an information recording apparatus.

2. Description of the Related Art

In recent years, there has been a growing demand for high speed recording on an optical information recording medium. In turn, technologies for increasing the recording speed of the disk type optical information recording medium are rapidly developing since the recording/reproducing speed in this type of optical information recording medium can be increased by simply increasing its rotational speed. Particularly, an optical disk (disk type optical information recording medium) that can record information simply through intensity modulation of light that is irradiated upon recording is becoming increasingly popular these days. The simplicity of the recording mechanism of this type of optical disk enables a reduction of cost of the recording medium as well as the recording device. Also, since the intensity-modulated light is also used in the reproduction of the information, excellent compatibility can be realized with a reproducing-only apparatus. With the increase in the capacity of electronic information in recent years, there is presently an even greater demand for higher density and higher speed in the information recording technology.

The above described optical disk that is further characterized by using a phase change material is becoming the mainstream optical recording medium since it can be rewritten numerous times. In the optical disk using the phase change material, recording is performed by modulating the intensity of the irradiated light beam and creating a rapidly cooled state and a slowly cooled state in a recording layer material. When the recording layer material is rapidly cooled, an amorphous state is created, and when it is cooled slowly, a crystalline state is created. Thus, optical information can be recorded owing to the difference in optic physical properties between the amorphous state and the crystalline state.

The recording principle of the above optical disk uses complicated mechanisms of 'rapid cooling' and 'slow cooling' of the recording layer material. Thus, in high speed recording, the recording light undergoes a pulse division and a three-level intensity modulation to then be irradiated onto the recording medium. For example, this recording method is disclosed in Japanese Patent Laid-Open Publication No. 9-219021, Japanese Patent Laid-Open Publication No. 9-138947, Recordable Compact Disc Systems Part III ("Orange Book Part III") version 2.0, Recordable Compact Disc Systems Part III ("Orange Book Part III") Volume 2 version 1.1, and DVD+RW Basic Format Specifications version 1.1.

FIGS. 1A-1D are diagrams for illustrating the above recording method, wherein a mark shown in FIG. 1A is turned into data as shown in FIG. 1B where marked portions correspond to 'High' and unmarked portions correspond to 'Low'. The above recording method is suitable for use in mark length recording or mark space recording. The mark has a temporal length that is an integer multiple of a basic clock period T. That is, the mark to be recorded has a temporal length nT where n is a natural number. The value range for the natural number n varies depending on the modulation method. In a compact disk system, n is within a range of 3-11. In a DVD system, n may take a value within the range of 3-11 or 14. In this drawing, n is set to n=6.

In the above described prior art, in order to form a mark with a temporal length of nT, an m number of multi pulses are irradiated as shown in FIG. 1C. The number m depends on the value of n, and their relationship is either m=n−1 or m=n−2. This is because the minimum value of n in a CD or DVD is 3. Also, an irradiation period of the pulse, that is, the rise period of each pulse is 1T, as shown in FIG. 1C where m=n−1, and in FIG. 1D where m=n−2. However, in either case, the period and width of a first pulse is independently set.

This recording method is characterized in that an increase of 1T in the mark length can be accommodated simply by adding one more pulse, and is thus very suitable for mark length recording.

However, when the recording speed is increased, the basic clock frequency increases. For example, in a 24× high-speed CD-RW, the basic clock frequency is 104 MHz, and in a 5× high-speed DVD-RW or DVD+RW, the basic clock frequency is 131 MHz. Thus, when recording is performed according to the conventional recording method (recording strategy) in these cases, the rise time and fall time of the pulse will take up a large portion of the total pulse irradiation time thereby decreasing the effective irradiation light energy, namely, the integration value.

FIGS. 2A-2C are exemplary diagrams illustrating the above effect. In these drawings, the dotted lines show the ideal irradiation waveforms and the solid lines show the actual light emission waveforms. In FIG. 2A, the actual light emission waveform is not rectangular as indicated by the dotted lines because of the time required for the rise and fall of the pulse. Thus, the pulse has a waveform as indicated by the solid line. When the basic clock is sped up further so that the rise time and fall time take up an even larger portion of the total irradiation time in the basic clock period, the irradiated pulse will be unable to reach a sufficiently high peak power Pw and a sufficiently low bottom power Pb as shown in FIG. 2B. That is, the peak power Pw will be Δ Pw lower and the bottom power Pb will be Δ Pb higher than the desired level. When the peak power Pw is lowered, there will be a decrease in the volume of material that can rise in temperature to a level sufficient for the material to turn amorphous. Also, when the bottom power Pb is not low enough, rapid cooling will be hampered thereby causing a re-crystallization of the material. This causes a decrease in the reproduction signal amplitude leading to a significant degradation of the reproduction reliability.

In order to solve the above described problem, a light source (laser diode and its drive unit) that can realize light emission with a short rise time and fall time is needed. However, to effectively function with a frequency above 100 MHz, the rise time and fall time need to be below 1 ns, which is very difficult to realize with the present technology.

Thus, in Japanese Patent Laid-Open Publication No. 9-134525 and in U.S. patent application Ser. No. 5732062, a technology for high speed recording using the conventional light emission source is disclosed. According to these prior art inventions, the number of irradiated recording pulses are reduced so that the mark having a length that is n times the basic clock period T, that is, the mark with a temporal length of nT, is formed through irradiation of m pulses where n=2m when n=even number, and where n=2m+1 when n=odd number, as opposed to the conventional art where n−1 pulses are irradiated for the same mark. For example, in a CD-RW that uses the EFM modulation (Eight to Fourteen Modulation; 8-14 modulation), n is a natural number within a range of 3-11. Thereby, in the conventional art when n=3, 4, 5, 6, 7, 8, 9, 10, and 11, the corresponding irradiation pulse numbers are: 2, 3, 4, 5, 6, 7, 8, 9, and 10, respectively. On the other hand, according to the methods disclosed in Japanese Patent Laid-Open Publication No. 9-134525 and U.S. patent application Ser. No. 5,732,062, when n=3, 4, 5, 6, 7, 8, 9, 10, and 11, the corresponding irradiation pulse numbers are: 1, 2, 2, 3, 3, 4, 4, 5, and 5, respectively. In this way, the pulse number can be reduced approximately by a half of the number of pulses used in the conventional art. Accordingly, the irradiation time of one pulse changes from 0.5T for the irradiation of n−1 pulses to 1T, which is double the conventional irradiation time, so that influence from the rise time and fall time can be reduced.

On the other hand, since the same number of pulses (m pulses) are irradiated to form recording marks with differing lengths 2mT and (2m+1)T, the irradiation period cannot be fixed. That is, when forming a recording mark with a length nT when n=2m, an irradiation time (the time when P=Pw) and a cooling time (the time when P=Pb) of a given pulse has to be made shorter compared to a case in which a recording mark with the length nT when n=2m+1 is recorded.

In Japanese Patent Laid-Open Publication No. 2001-331936, a recording method using an m number of multi-pulses for forming a recording mark with a temporal length of nT wherein n/m≧1.25 is disclosed. As in the above Japanese Patent Laid-Open Publication No. 9-134525, this patent application also describes the technology for recording marks with differing temporal lengths nT both when n=2m and n=2m+1 by irradiating the same number of pulses (m pulses). Herein, the irradiation time of the pulse is adjusted by modifying the irradiation time and cooling time of the first pulse and last pulse.

However, basically, according to the above methods, the irradiation time and the cooling time of all the pulses for each of the various mark lengths have to be defined. In turn, 69 parameters will be needed in the EFM (8-14 modulation) that is used in a compact disk and 77 parameters will be needed in a EFM+ (one type of the 8-14 modulation) used in a DVD. Thus, various techniques for reducing the number of parameters needed for defining the pulses are being proposed. For example, the irradiation time of a first pulse when m≧3 can be made to conform to a uniform length instead of being based on n, or the irradiation time and the cooling time of the middle pulses (the pulses other than the first and last pulses) can be made to conform. However, in the above examples, when m=1 or 2, that is, when n≦5, the parameters have to be set individually for each case. Therefore, a very large number of parameters will still be needed for defining the recording light emission waveform (recording strategy). Further, when the recording speed (scanning velocity) varies, a different recording pattern is needed for each recording speed. In such case, the irradiation time when P=Pw (i.e. the actual time of the pulse width as opposed to the relative time with respect to the clock period that can change depending on the recording speed) can be made to have a uniform length regardless of the recording speed.

Also, in a WORM (write once, read many) optical disk or a rewritable optical disk as represented by the CD-R/RW or the DVD+R/RW, parameters relating to the recording conditions of the disk are normally preformatted on the disk itself. For example, the preformatted disk information may be in the form of ATIP (Absolute Time in Pregroove) Extra Information in a CD-R/RW, or ADIP (Address in Pregroove) Physical Information in a DVD+R/RW. The preformatted disk information includes basic features such as the type of disk and the version of the disk standard, parameters needed for calculating the recordable scanning velocity and the optimum recording power in a test recording, and parameters that specify the optimum recording strategy. As for the parameters that specify the optimum recording strategy, there are $\epsilon$ (=Pe/Pw), and Strategy Optimization ($dT_{top}$, $dT_{era}$) according to CD-RW standard specifications, and $T_{top}$, $dT_{top}$, $T_{mp}$, $dT_{era}$, $\epsilon_1$, $\epsilon_2$, according to DVD+RW standard specifications.

The information recording apparatus reads the above information upon recording information on a disk, and determines the recording strategy. Thus, it is preferable that detailed parameters be provided so that the recording device can determine an accurate recording strategy. However, detailed parameters will lead to an increase in information capacity requirements. Particularly, in a CD-R/RW system, the information capacity for recording the preformatted information is limited and in the case of a CD-RW, information worth 21 bits×6=126 bits is the maximum capacity for the preformatted information. To pre-format additional information, an area has to be newly defined in an unused area in either the outermost portion or the innermost portion of the disk such as the XAA (extra additional information area) in a multi-speed CD-R, or otherwise, the information has to be recorded using a pre-pit and the like.

As described above, the recording device reads the preformatted disk information upon recording information on the disk and sets the optimum recording strategy. When each disk has a large amount of parameter information, the processing of the information content becomes complex thereby causing the strategy generation circuit to be complicated.

Also, as mentioned earlier, it is preferable that the pulse irradiation time be arranged to be uniform. However, since marks with different lengths 2mT and (2m+1)T are recorded by irradiating the same number of m pulses, it is impossible to fix the irradiation period to a uniform time period. In the above case, when the irradiation period of a mark with length nT (where n=2m or n=2m+1) is set according to the value of n, the strategy generation circuit will be very complicated. That is, the irradiation period will have to be set individually for each case, and when the irradiation pulse timing is set individually as opposed to being in accordance with the basic clock timing, the circuit design becomes extremely complicated.

Also, under the restriction of having to record marks having differing lengths 2m and 2m+1 with the same number of m pulses, if the method according to the so-called "Orange Book Part III" is used, wherein only the pulse width of the last pulse is adjusted when the value n of the mark with length nT is an odd number, the difference in the irradiation between the last pulse and the rest of the pulses will be too distinct and the mark formed will not have a consistent shape (the mark corresponding to the last pulse is likely to become larger). As a result, reproduction signals for this recording mark will have a distorted waveform, causing an increase in the generation of jitters.

Also, for the reasons described above, the determination of the recording strategy is preferably realized with few parameters but with accuracy.

SUMMARY OF THE INVENTION

It is an object of the present invention to provide an information recording method, an information recording apparatus and an optical information recording medium in compliance with a recording technique for forming a recording mark with a multi-pulse sequence, which is enhanced by one irradiation power Pw pulse for every increase of 2T in a temporal length nT of the recording mark, this recording technique being applicable to high speed recording, wherein distortion of the waveform of a reproducing signal for the recording mark can be reduced by determining a recording strategy that can realize improved consistency in the shape of the recording mark being formed when the value n of the mark length nT is an odd number.

Also, it is an object of the present invention to provide an information recording method, an information recording apparatus and an optical information recording medium in compliance with a recording technique for forming a recording mark with a multi-pulse sequence, which is enhanced by one irradiation power Pw pulse for every increase of 2T in a temporal length nT of the recording mark, this recording technique being applicable to high speed recording, wherein the circuit design for realizing the above technique can be simplified.

Additionally, it is an object of the present invention to provide an information recording method, an information recording apparatus and an optical information recording medium in compliance with a recording technique, wherein only a few parameters are set to determine an optimum recording strategy for a plurality of scanning velocities as opposed to a recording technique for high speed recording that uses a large number of parameters to determine a complex recording strategy.

More specifically, the present invention provides an information recording method for recording information on an optical information recording medium using a mark length recording scheme in which a temporal length of a recording mark is represented as nT where n denotes a natural number and T denotes a basic clock period, wherein:

the recording mark is formed by a multi-pulse sequence, which is increased by one pulse with an irradiation power Pw for every increase of 2T in the temporal length nT; and a recording strategy, used in forming the recording mark, controls the multi-pulse sequence so that:

when $n \geq 4$, the fall of a first pulse of the multi-pulse sequence is synchronized with the basic clock; and when n is an odd number and $n \geq 7$, a period from the fall of the first pulse to the fall of a second pulse in the multi-pulse sequence is arranged to be greater than 2T and in synchronization with the basic clock, periods of pulses after the second pulse except for a last pulse of the multi-pulse sequence are arranged to be 2T, and a period from a fall of a second to last pulse to the fall of the last pulse, denoted as $T_1O$, is set to $T_1O=(2+\delta_1O)T$ where $0<\delta_1O \leq 1$.

According to another aspect, the present invention provides an information recording apparatus that records information on an optical information recording medium according to a mark length recording scheme in which a temporal length of a recording mark is represented as nT where n denotes a natural number and T denotes a basic clock period, the information recording apparatus comprising:

a rotational drive structure that rotates the optical information recording medium;

a laser light source that generates a light beam, which is irradiated on the optical information recording medium;

a light source drive unit that administers the laser light source to emit light;

a light emission waveform control unit that controls the light source drive unit when a recording strategy relating to a light emission waveform of the light beam generated by the laser light source is set; and a speed control unit that controls a relative scanning velocity between the rotation of the optical information recording medium and the light beam irradiated on said optical information recording medium, wherein:

the light emission waveform control unit uses the recording strategy to control the light emission waveform so that:

when $n \geq 4$, the fall of a first pulse of the multi-pulse sequence is synchronized with the basic clock; and when n is an odd number and $n \geq 7$, a period from the fall of the first pulse to the fall of a second pulse in the multi-pulse sequence is arranged to be greater than 2T and in synchronization with the basic clock, periods of pulses after the second pulse except for a last pulse of the multi-pulse sequence are arranged to be 2T, and a period from the fall of a second to last pulse to the fall of the last pulse, denoted as $T_1O$, is set to $T_1O=(2+\delta_1O)T$ where $0<\delta_1O \leq 1$.

Further, the present invention according to another aspect provides an optical information recording medium on which information is recorded using the information recording method according to the present invention wherein:

information of $\delta_1O$ as a parameter for determining the time $T_1O$ is preformatted on the optical information recording medium.

BRIEF DESCRIPTION OF THE DRAWINGS

FIG. 14 shows a conversion table for a parameter $T_{d1}$;

FIG. 15 shows a conversion table for a parameter $T_{d2}$;

FIG. 16 shows a conversion table for a parameter $T_{d2}'$;

FIG. 17 shows a conversion table for a parameter $T_{mp}$;

FIG. 18 shows a conversion table for a parameter $T_{mp}'$;

FIG. 19 shows a conversion table for a parameter $\delta_1O$;

FIG. 20 shows a conversion table for a parameter $\delta_2$;

FIG. 21 shows a conversion table for a parameter $\delta_3$;

DESCRIPTION OF THE PREFERRED EMBODIMENTS

In the following, preferred embodiments of the present invention are described with reference to the accompanying drawings.

An embodiment according to the present invention is applicable to an information recording method and an information recording apparatus (including an information reproducing apparatus) for an optical information recording medium, particularly, a phase change optical information recording medium, on which information can be recorded, erased, or rewritten through intensity modulation of an irradiated light.

Recording on an optical information recording medium is realized by irradiating and scanning an intensity-modulated light beam and forming a recording mark on the recording medium. The recording mark is formed on a recording layer of the recording medium through the light irradiating on an area that differs in optical characteristics from the rest of the layer portion. The information recording/reproducing apparatus reproduces the recorded information based on the difference in optical characteristics of this recording mark portion. The state of the recording mark portion varies depending on the type of recording layer material used. In a case where a magnetic recording layer material is used, the recording mark portion is an area that differs in the magnetic field orientation, and in a case where a phase change recording layer material is used, the recording mark portion will be an area that has a different phase. In a rewritable optical information recording medium that uses the phase change material, which is currently the most popular recording medium, the recording layer material includes a crystalline phase and an amorphous phase (non-crystalline phase). Examples of the phase change recording layer material are SbTe alloy, GeSbTe alloy, AgInSbTe alloy, and GaGeSbTe alloy. In the phase change recording layer material, the crystalline phase and the amorphous phase have very different optical properties, and thus, information can be recorded by forming an amorphous phase mark in the crystalline phase. Further, if a reversible phase transition between the crystalline phase and the amorphous phase can be realized, the recording medium will be a rewritable optical information recording medium.

(Information Recording Method)

Figure 3:
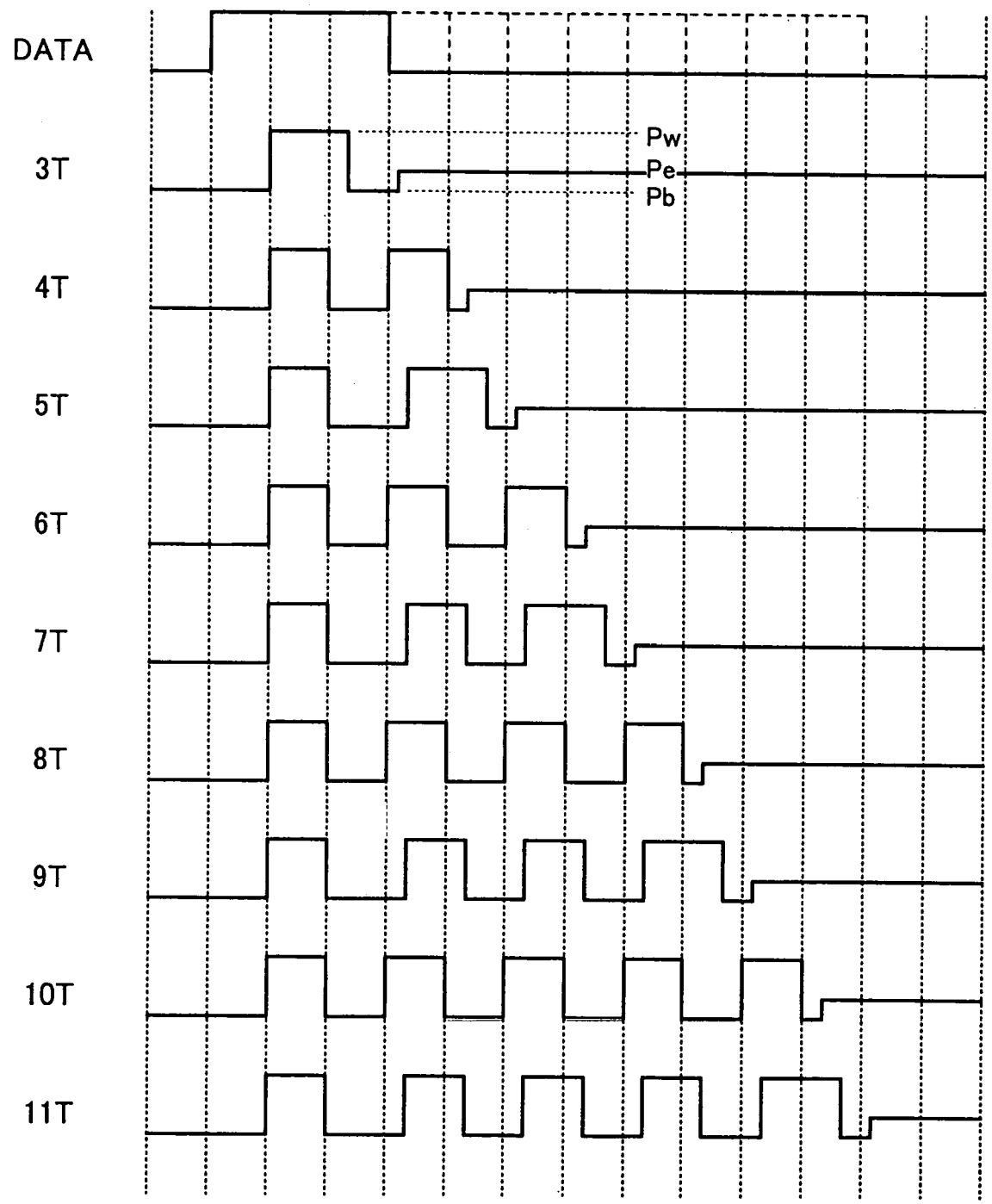
FIG. 3 shows exemplary waveforms of recording strategies according to an embodiment of the present invention.
Figure 4:
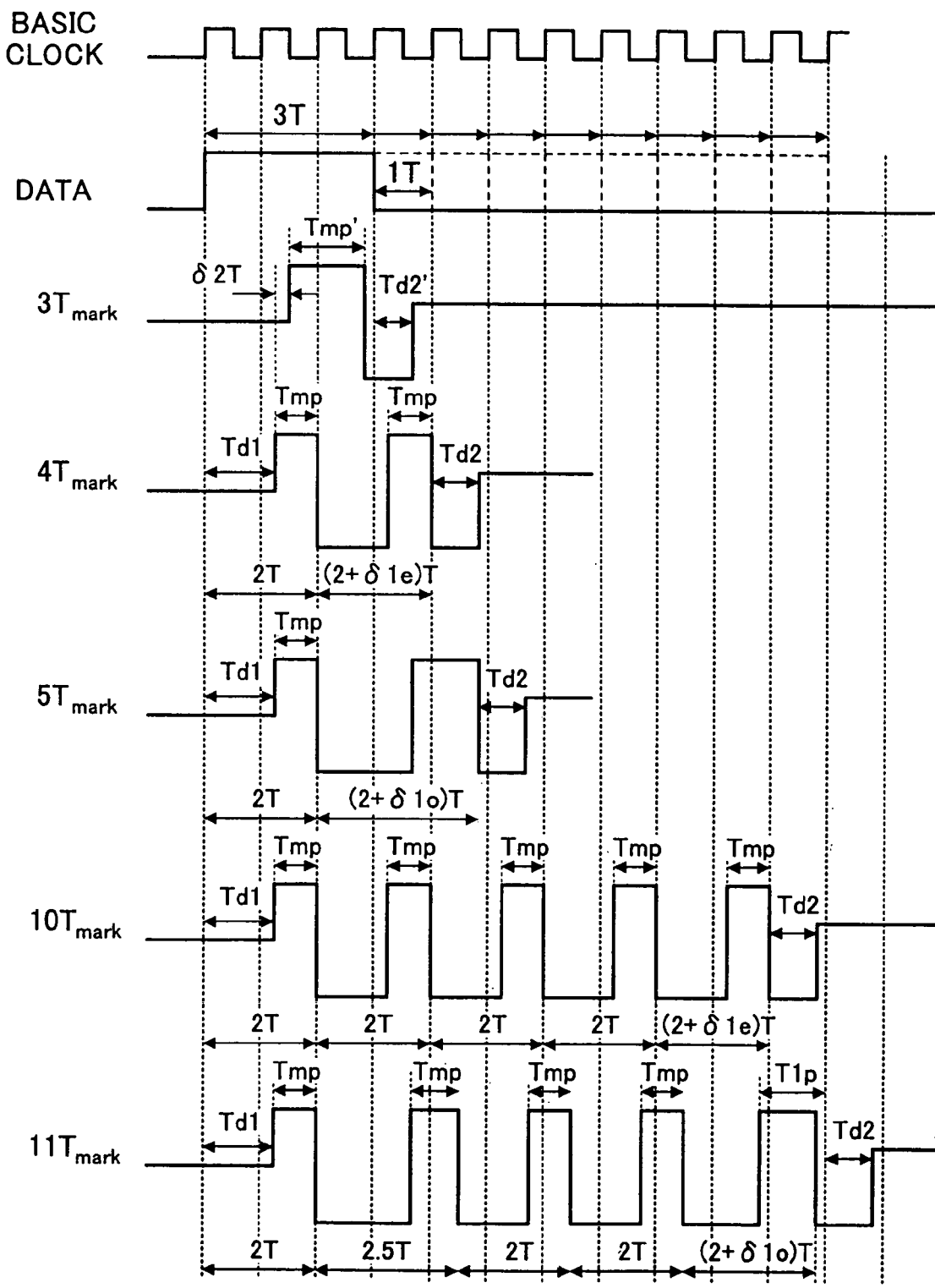
FIG. 4 shows extractions of waveforms corresponding to the recording strategies for marks with various lengths.

To form an amorphous mark in a crystalline phase, light condensed at the recording layer or its surrounding area is irradiated and scanned. As described above, an intensity modulated light beam is used for the irradiation. FIGS. 3 and 4 show light emission waveforms (recording strategies) using intensity modulation, which is a prerequisite of the embodiment of the present invention. At the top of FIG. 4, information that is to be recorded, indicated as 'DATA', is shown. According to the information recording method of the present embodiment, information is recorded through mark length/mark space length modulation, which is a PWM (Pulse Width Modulation) technique applied to an optical information recording medium. In this recording technique, the length of the recording mark and the length of a mark space (blank space) are controlled by a unit T, which is the basic clock period. According to this technique, the recording density can be increased compared to a mark position modulation technique, which is another recording technique for an optical information recording medium. Thus, the mark length/mark space length modulation is used in optical disks such as the CD and DD (Double Density) CD, which use the EFM (8-14 modulation) scheme or the DVD, which uses the EFM+ (8-14+ modulation) scheme. In the mark length/mark space length modulation, it is important to accurately control the length of the mark and the length of the mark space. Specifically, both the mark and the mark space must have a temporal length of nT where T is the basic clock period and n is a natural number.

Figures 1A, 1B, 1C, 1D:
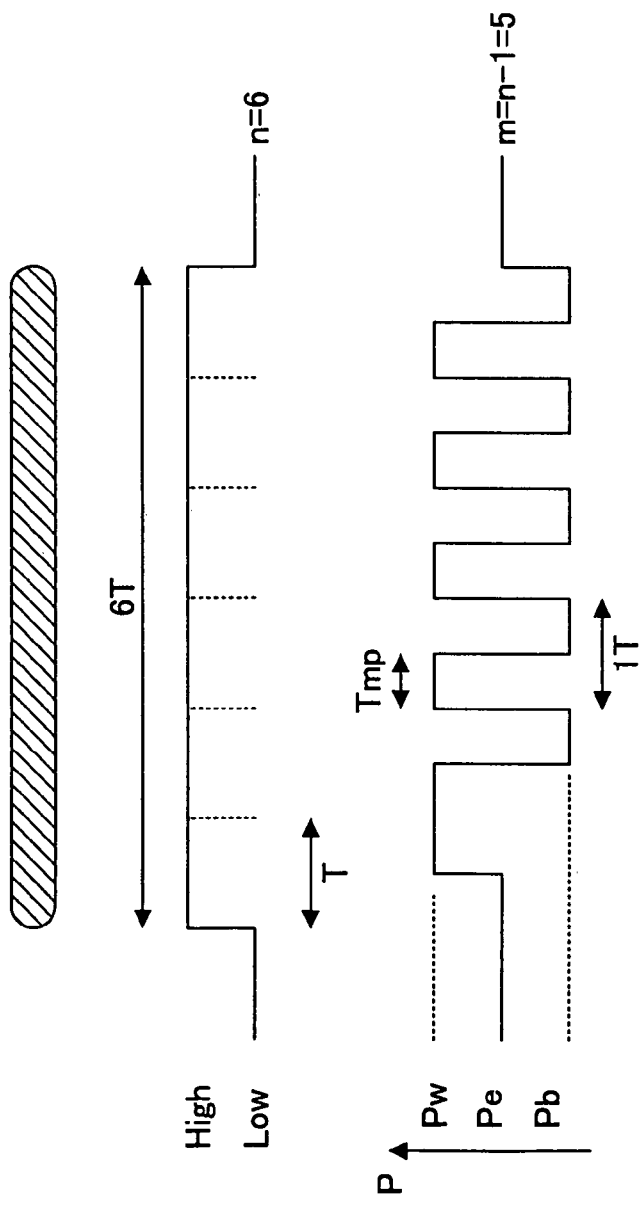
FIGS. 1A-1D show exemplary waveforms of a recording strategy according to the related art.
Figure 2A:
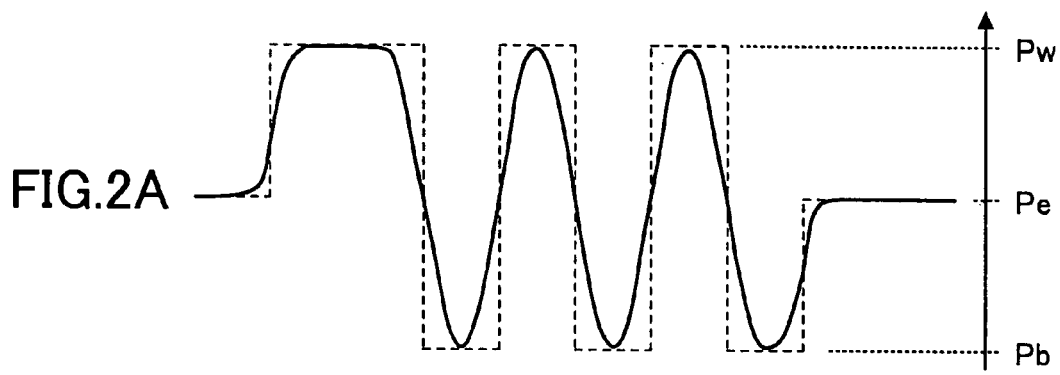
FIGS. 2A-2C show ideal irradiation waveforms and the actual light emission waveforms.
Figure 2B:
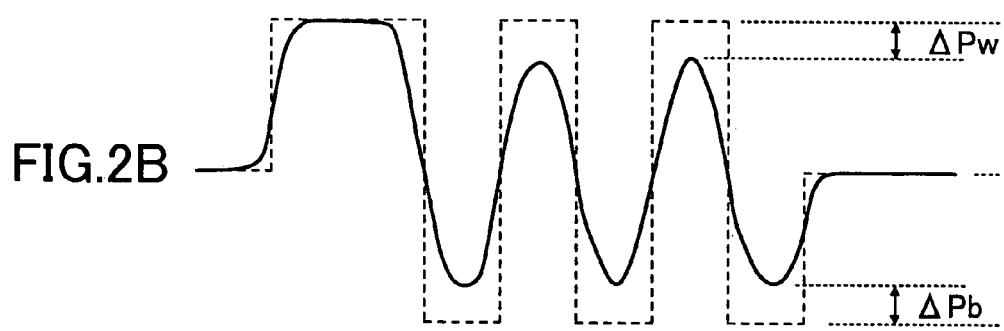
Figure 2C:
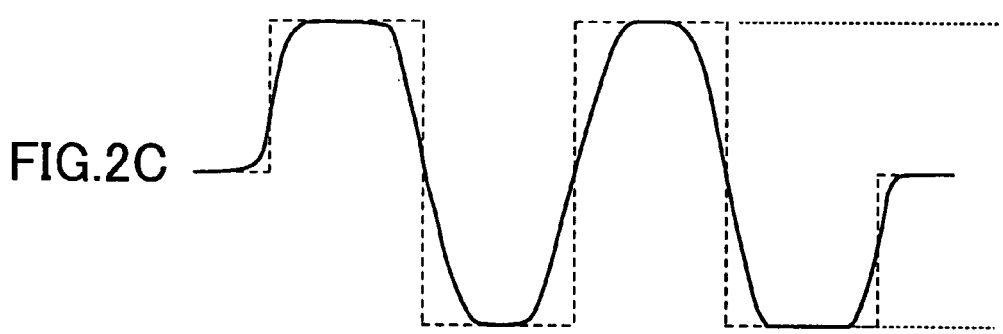

In FIG. 4, the horizontal axis represents the temporal length, and the vertical axis represents either the information that is to be recorded (for the 'DATA') or the intensity of the irradiated light (for marks 3T, 4T, 5T, 10T, and 11T). The sections of the 'DATA' positioned at a 'High' (see FIG. 1B) level correspond to the mark portion. Since FIGS. 3 and 4 show exemplary waveforms obtained from the EFM (8-14 modulation) or the EFM+ (8-14+ modulation), n takes a value within the range of 3-11 or 14. FIG. 4 shows extractions of the recording strategy when n=3, 4, 5, 10, and 11. The recording strategy when n=10 shown in FIG. 4 is a representative example of the recording strategy in cases where n is an even number that is greater than or equal to 6 ($n \geq 6$). On the other hand, the recording strategy when n=11 is a representative example of the recording strategy in cases where n is an odd number that is greater than or equal to 7 ($n \geq 7$). As mentioned above, the vertical axis represents the intensity of the irradiated light (irradiation power) P. The intensity of the irradiated light or the irradiation power takes either one of three values Pw, Pe, and Pb, and the relationship between the three values is: Pw>Pe>Pb. Hereinafter, Pw will be referred to as 'recording power', Pe will be referred to as 'erasing power', and Pb will be referred to as 'bias power'. When a light beam is irradiated at P=Pe, the phase change recording layer will be turned into a crystalline state. That is, the mark will be erased (a mark space is recorded). On the other hand, when light is irradiated with an intensity modulation of P=Pw or P=Pb, the phase change recording layer will be turned into an amorphous state. That is, a recording mark will be formed. The powers (light intensities) of Pw, Pe, and Pb are determined based on the thermal characteristics and optical characteristics of the recording phase material of the recording medium. However, it is preferable that the erasing power Pe be within a range of 0.2-0.6 w, and the bias power Pb be within a range of 0-0.1 w.

The recording strategy according to the present embodiment uses each of an m number of on pulses with the power P=Pw and an m number of off pulses with the power P=Pb. The relationship between n and m is such that when n is an even number $n_1$, $n_1=2m$, and when n is an odd number $n_2$, $n_2=2m+1$. Consequently, the recording mark is formed by a multi-pulse sequence that has each of one on pulse and one off pulse added for every increase of 2T in the temporal length nT. Herein, the pulse width (irradiation time) of the $i^{th}$ (i=1, ..., m) on pulse (P=Pw) for forming a recording mark with a temporal length of nT is denoted as $T_{on}(n, i)$. According to the present embodiment, the pulse period can be approximately doubled compared to the pulse period obtained using the conventional m=n−1 recording strategy in a CD-RW, DVD-RW, and DVD+RW. As a result, the length of $T_{on}/T$ can be increased and the influence from the rise time and fall time of the power P can be reduced in relative terms. Thereby, the present embodiment can be applied to high speed recording in which the basic clock period is shortened.

In the present embodiment, the irradiation time is not fixed and can be arbitrarily set; however, it is preferable that it be within a range of 0.5-1.5T. That is, when the irradiation time is shorter than 0.5T, the time is too short to supply sufficient energy to the recording layer, thereby causing the width of the recording mark to be narrowed, the amplitude of the recording signal to be reduced, and the modulation capacity to be lowered so that the reproducing reliability of the recording medium is degraded. On the other hand, when the irradiation time $T_{on}$ is longer than 1.5T, the time when the power P=Pb becomes relatively short, thereby making it difficult to maintain a rapid cooling state. As a result, although sufficient energy can be supplied to the recording layer, the size of the recording mark is reduced due to re-crystallization. Further, since the absolute amount of energy charged on the recording medium is increased, thermal damage is created in the recording layer and its surrounding areas when recording and rewriting (overwriting) is performed numerous times, this resulting in the degradation of the reliability of the recording medium.

Figure 5:
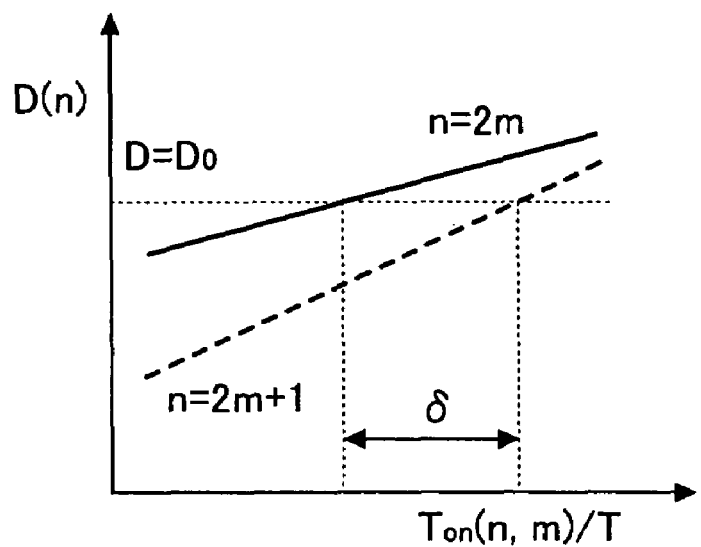
FIG. 5 shows the relationship between a last pulse and a mark deviation.

In the recording strategy according to the present embodiment, the irradiation time of the $m^{th}$ pulse (the last pulse), that is, $T_{on}(n, m)$, exerts the greatest influence on the length of the mark that is to be recorded. This is particularly the case when $n=n_2$ (odd number). In FIG. 5, the relationship between the irradiation time $T_{on}(n, m)$ and the mark deviation is shown. The mark deviation D(n) can be represented by the formula D(n)=L(n)−nT, wherein L(n) denotes the reproduced mark length. That is, when D(n)=0, this means that there is no difference between the logical mark length and the actual mark length, and thus the desired mark length can be reproduced. When n is an odd number (n=2m+1), the irradiation time $T_{on}(n, m)$ becomes more dependent upon D compared to the case when n is an even number (n=2m). This is because marks having differing lengths $n_1 \cdot T$ and $n_2 \cdot T$ are recorded using the same number of pulses (m pulses). Since the mark length $n_2 \cdot T$ is 1T longer than the mark lengthen $n_1 \cdot T$, this difference needs to be compensated for by the pulse interval (irradiation period of each pulse) and the irradiation time $T_{on}(n, i)$ of each pulse.

The pulse irradiation period is a factor influencing the consistency of the mark shape. When the pulse irradiation period of each pulse is not uniform, the shape of the recording mark is more likely to be distorted and as a result, the reproduced signal will also be distorted and jitter characteristics will be degraded (jitter will increase). This tendency is particularly evident in a case where the pulse irradiation time $T_{mp}$ is short, that is, a case where the pulse width for P=Pw is short and the time when P=Pb is relatively long.

Therefore, it is preferable that the pulse irradiation period of each pulse be uniform. Further, it is preferable that this uniform pulse irradiation period be approximately nT/m. However, when the pulse period is set according to n, the recording strategy generation circuit will be complicated.

In response, measures are made to simplify the recording strategy generation circuit. Specifically, when n is an odd number and n≧5, the fall position of the first pulse is synchronized with either the rise or fall of the basic clock. For example, the fall of the first pulse may be positioned 2T away from the rise time of the logical data pulse (DATA pulse). Further, when n is an odd number and n≧7, the period from the fall of the first pulse till the fall of the second pulse is set to be longer than 2T but still in synchronization with the basic clock, the period typically being 2.5T. The periods of the rest of the pulses (from the third pulse and onward), except for the last period, are arranged to be 2T. The period from the fall of the second to last pulse (i=m−1) and the fall of the last pulse (i=m) is arranged to be $(2+\delta_1 O)T$, where $\delta_1 O$ is set to take a suitable value within a range of $0<\delta_1 O \leq 1$, so as to minimize the mark deviation D(n). Thus, in the case where n is an odd number and n≧7, the multi-pulse sequence is suitably arranged by adjusting both the first and last pulses so that an overall consistency in the shape of the mark can be maintained in recording this mark, as opposed to adjusting only the last pulse in which case the consistency in the shape of the mark will be greatly sacrificed. In turn, the distortion of the waveform of the reproducing signal can be prevented and the jitter characteristics can be improved. Also, since the fall of the first pulse as well as the fall of the second pulse and the rest of the pulses except for the last pulse are all synchronized with either the rise or fall of the basic clock by setting the interval periods to 2.5T or 2T, the design of the recording strategy generation circuit that generates the actual recording strategy can be simplified. Further, by optimizing the irradiation time of each pulse, the consistency in the shape of the mark can be maintained.

Additionally, in the case where n=5, the second pulse corresponds to the last pulse. Therefore, the period between the fall of the first pulse and the fall of the second pulse will be $(2+\delta_1 O)T$, where $0<\delta_1 O \leq 1$.

When n is an even number and n≧4, the fall of the first pulse is also synchronized with either the rise or fall of the basic clock. For example, the fall of the first pulse may be positioned 2T away from the rise time of the logical data pulse (DATA pulse). Further, when n is an even number and n≧6, the periods of the second pulse and onward, except for the last pulse, are set to 2T so that the recording strategy generation circuit can be simplified. Also, the period between the fall of the second to last pulse (i=m−1) and the fall of the last pulse (i=m) is arranged to be $(2+\delta_1 e)T$, where $\delta_1 e$ is set to a suitable value within a range of $0<\delta_1 e \leq 1$, so that the mark deviation D(n) can be minimized. Since the fall of the first pulse as well as the fall of the second pulse and the rest of the pulses except for the last pulse are all synchronized with either the rise or fall of the basic clock by setting the pulse periods to 2T, the design of the recording strategy generation circuit that generates the actual strategy can be simplified. Further, by optimizing the irradiation time of each pulse, the consistency in the shape of the mark can be maintained.

When n is an even number, the mark deviation D(n) is smaller compared to when n is an odd number. Thus, the period between the fall of the second to last pulse (i=m−1) and the fall of the last pulse (i=m) may be set to 2T to further reduce the parameters used in the recording. That is, when n is an even number and n≧6, the value $\delta_1 e$ is set to $\delta_1 e=0$ so that the periods of the pulses from the second pulse and onward, including the last pulse, all have uniform lengths of 2T. In this way, the circuit design can be further simplified and the consistency in the shape of the mark can be improved further.

Additionally, in the case where n=4, the second pulse corresponds to the last pulse. Therefore, the period between the fall of the first pulse and the fall of the second pulse will be $(2+\delta_1 O)T$, where $0<\delta_1 O \leq 1$ and if $\delta_1 e=0$, this period will also be 2T.

In the present embodiment in which the mark length/mark space length modulation recording is performed, the mark space length is just as important as the mark length. In binary information, a mark and space are perceived as equals, and only the boundary between a mark and space is perceived as a point of significance. Normally, once the mark length is determined, the space length is automatically determined. However, in the present embodiment the space length is largely dependent upon the mark positioned before and after the space. That is, the space length of a space placed after a recording mark when n is an odd number and the space length of a space placed after a recording mark when n is an even number may have varying lengths. Thus, the space length needs to be controlled as well as the mark length according to the present embodiment.

To optimize both the mark length and the mark space length, the starting time $T_{d1}$ of the rise of the first pulse, and the deviation time $T_{d2}$ of the starting time of the rise of the pulse to P=Pe after the $m^{th}$ off pulse with respect to the data termination time need to be controlled. Particularly, the deviation time $T_{d2}$ exerts a significant influence on space jitters. This is because the deviation time $T_{d2}$ is a parameter for determining the starting time of a space positioned after a recording mark. Thereby, this deviation time $T_{d2}$ needs to be set to an optimum value according to each mark length.

However, for a recording mark in which $n \geq 4$, the deviation time $T_{d2}$ can be made to conform to a uniform time length. In this case, the deviation time $T_{d2}$ is preferably set to $-1T \leq T_{d2} \leq +1T$. More specifically, the deviation time $T_{d2}$ is optimally set to $-0.5T \leq T_{d2} \leq 0.75T$.

On the other hand, the rise starting time $T_{d1}$ also exerts an influence on space jitter. Since $T_{d1}$ and $T_{d2}$ are relative to each other, the range of $T_{d1}$ when $n \geq 4$ is preferably $0.0T \leq T_{d2} \leq +1.0T$.

In the above description, ways of forming a plurality of parameters into one uniform parameter in determining the recording strategy have been described. However, for the 3T mark, which is the smallest mark, the parameters have to be set individually. This is because in the 3T mark m=1 and its pulse corresponds to the first as well as the last pulse. Thus, the strategy pattern for the 3T mark will clearly be different from the strategy patterns where $m \geq 2$. In turn, the pulse irradiation time $T_{on}$ needs to be set individually to $T_{on}(3, 1) = T_{mp}'$. The pulse irradiation time $T_{mp}'$ is optimized according to the thermal characteristics and the optical characteristics of the recording layer material and also the scanning velocity and the basic clock period for the relevant recording. Further, the pulse irradiation time $T_{mp}'$ is preferably within a range of 0.5-2.0T. Similarly, times $T_{d1}$ and $T_{d2}$ also need to be set individually when n=3. In this case, $T_{d1}$ is set to $T_{d13} = T_{d1t} + \delta_2 T$, where $\delta_2$ is preferably within a range of $0 \leq \delta_2 \leq 1$, and the deviation time $T_{d2}$ when n=3, denoted as $T_{d2}'$, is preferably set to $-1T \leq T_{d2}' \leq 1T$.

Figure 6:
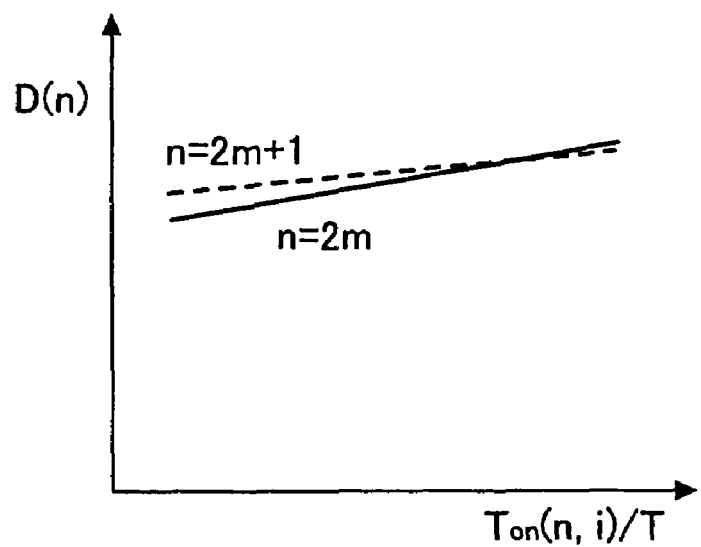
FIG. 6 shows the relationship between a pulse other than the last pulse and the mark deviation.

As described above, in order to improve the consistency in the shape of the mark and the corresponding jitter, the recording power irradiation time of the last pulse $T_{on}(n, m)$ of the recording multi-pulse sequence and the recording power irradiation time of the other pulses $T_{on}(n, i)$ (i=1 through m−1) need to be optimized. However, it is known that the pulse irradiation times corresponding to the pulses other than the last pulse do not exert significant influences on the length of the recording mark. FIG. 6 shows a relationship between the mark deviation and the pulse widths of the pulses other than the last pulse. As shown in this diagram, the dependency of the pulses on the mark deviation is quite small regardless of whether n is an odd number ($n_2 = 2m+1$) or an even number ($n_1 = 2m$), and there is no great difference between a case where n is even and a case where n is odd. Therefore, the recording strategy relating to the irradiation time $T_{on}(n, i)$ of the pulses other than the last pulse can be made to conform to a uniform recording strategy regardless of whether n is even or odd.

That is, when $1 \leq i \leq m-1$, $m \geq 2$ (i.e. at least two pulses are used), and $n \geq 4$, all pulses can be made to conform to a uniform pulse width regardless of the values of n and i. Thus, the irradiation time $T_{on}(n, i)$ can be expressed by the following formula:

$$T_{on}(n, i) = T_{mp} \text{ (where } T_{mp} \text{ is a constant, } n \geq 4, \text{ and } 1 \leq i \leq m-1)$$

In this case, it is preferable that the constant $T_{mp}$ takes a value within in a range of 0.5-1.5T.

Further, when n is an even number, the influence of the last pulse on the recording mark is also quite insignificant. Thus, when n is even the irradiation time of the last pulse $T_{on}(n_1, m)$ may also be set to $T_{on}(n_1, m) = T_{mp}$ regardless of the value of $n_1$. Note that this arrangement also applies to the case when the EFM+ is used and n=14.

On the other hand, when n is an odd number, that is, when $n = n_2$, the pulse width of the last pulse can be made to conform to a uniform length regardless of the value of $n_2$ on condition that $m \geq 2$, namely, $n_2 \geq 5$. This is because the mark deviation $D(n_2)$ is not greatly influenced by the pulse width of the last pulse and is substantially fixed regardless of the value of $n_2$. However, if a pulse width with a length equivalent to that for $n_1$ is set, the odd number marks will tend to be relatively shorter than the even number marks as shown in FIG. 4. Thus, to cause the mark deviations for the $n_1 T$ mark and the $n_2 T$ mark to conform to a uniform deviation $D_0$, the irradiation time $T_{on}(n_2, m)$ of the last pulse for $n = n_2$ is made $\delta_3 T$ longer than the irradiation time $T_{on}(n_1, m) = T_{mp}$ for $n = n_1$. Accordingly, $$T_{on}(n_2, m) = T_{on}(n_1, m) + \delta_3 T$$

$$T_{1p} = T_{mp} + \delta_3 T$$

$$T_{on}(n_2, m) = T_{1p} \; (n_2 \geq 5, m \geq 2)$$

A suitable value for $\delta_3$ is determined according to the thermal characteristics of the recording layer of the optical information recording medium. It is preferable that the value of $\delta_3$ be within a range of 0-1.0; more specifically, within a range of 0-0.5. That is, when $\delta_3$ is above 1.0, the length of the odd number mark will be too long. Also, when $\delta_3$ is above 0.5, the effect of the change in the power Pw of the last pulse will be too strong and the dependency of the mark length on the recording power Pw will be very different from that when n is an even number, thereby significantly narrowing the recording power margin.

In this way, the irradiation time $T_{on}$ of each of the pulses can be made to conform to a uniform length $T_{mp}$ except for the last pulse when n is an odd number.

According to the above descriptions, the optimum recording strategy used in the information recording method of the present embodiment can be described with eight different parameters that are shown below:

$T_{mp}$
$T_{mp}'$
$\delta_1 0$
$\delta_2$
$\delta_3$
$T_{d1}$
$T_{d2}$
$T_{d2}'$ This is a significant reduction compared to the conventional method in which 69 parameters are used in the EFM (8-14 modulation) of the CD and 77 parameters are used in the EFM+ of the DVD. Further, since the time $T_{d1}$ is dependent upon the time $T_{d2}$ and can therefore be regarded as a fixed value, the substantial number of parameters used to describe the recording strategy is seven.

Additionally, when the above recording strategy is implemented and the recording speed (scanning velocity) is changed, adjustments can be made by changing the irradiation times $T_{mp}'$ and $T_{mp}$ with respect to the scanning velocity v for the relevant recording. The other parameters can remain fixed with respect to the basic clock period $T(v)$. That is, the parameters standardized by the basic clock period $T(v)$, namely, $\delta_1 O/T(v)$, $\delta_2/T(v)$, $\delta_3/T(v)$, $T_{d1}/T(v)$, $T_{d2}/T(v)$, and $T_{d2}'/T(v)$ are fixed regardless of the recording speed (scanning velocity).

The relationship between $T(v)$ and v can be expressed by the formula $T(v)=L_0/v$ given that the line density is fixed (i.e. the amount of information assigned to a line of one unit length in the scanning direction is fixed). Herein, $L_0$ denotes the length corresponding to the basic clock period T on the optical information recording medium, generally referred to as the 'channel bit length'. In the case of a DVD, $L_0=0.133$ μm, and in the case of a CD, $L_0=0.278$ μm or $L_0=0.324$ μm. Thus, for example, when the scanning velocity doubles, the basic clock period T will be reduced to one-half (½).

When the scanning velocity increases as described above, it is preferable that the actual irradiation times $T_{mp}'(v)$ and $T_{mp}(v)$ decrease and the relative irradiation times $T_{mp}'(v)/T(v)$ and $T_{mp}(v)/T(v)$ increase. For example, given that $v=v_L$ and $v=v_H (v_L<v_H)$, the relative time with respect to the basic clock period $T(v)$ will preferably be as follows:

$$T_{mp}(v_H)/T(v_H) > T_{mp}(v_L)/T(v_L)$$

$$T_{mp}'(v_H)/T(v_H) > T_{mp}'(v_L)/T(v_L)$$

However, the actual time will preferably be as follows:

$$T_{mp}(v_H) < T_{mp}(v_L)$$

$$T_{mp}'(v_H) < T_{mp}'(v_L)$$

Figure 7:
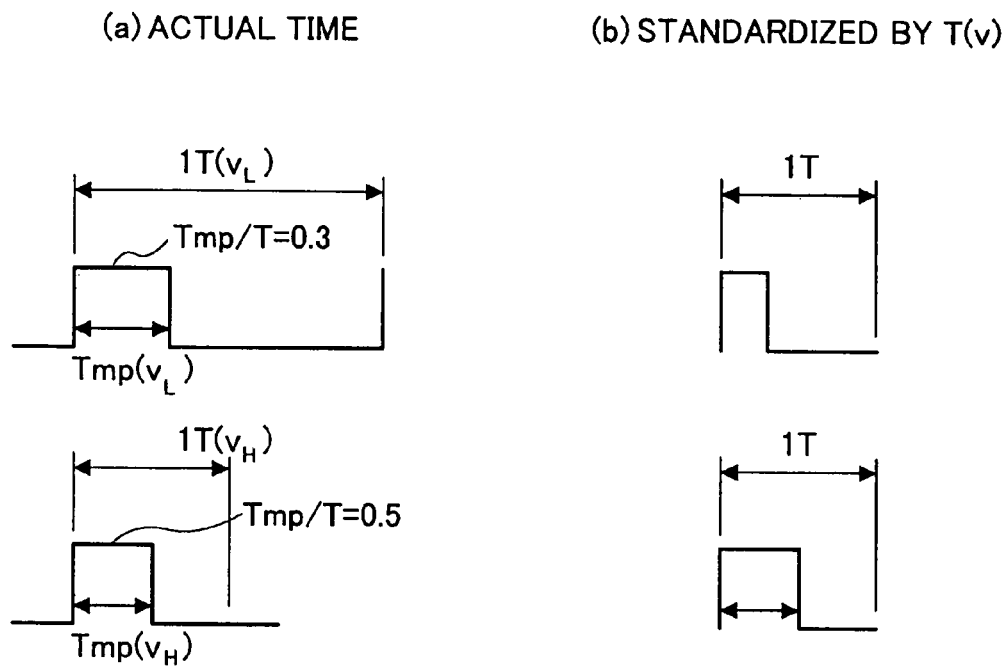
FIG. 7 shows how duty of an irradiation time changes in response to a change in a scanning velocity.

This is described in further detail with reference to FIGS. 7A and 7B. These drawings represent an exemplary case in which $v_L=1.0$, $v_H=2.0$, $T_{mp}(v_L)/T=0.3$, and $T_{mp}(v_H)/T=0.5$. In FIG. 7A, the actual time is shown where $T_{mp}(v_H)<T_{mp}(v_L)$. However, in FIG. 7B, the relative time is shown where the duties standardized by the respective basic clock periods $T(v_L)$ and $T(v_H)$ are: $T_{mp}(v_L)/T(v_L)=0.3$ and $T_{mp}(v_H)/T(v_H)=0.5$, so that $T_{mp}(v_H)/T(v_H)>T_{mp}(v_L)/T(v_L)$. Thus, the duties $T_{mp}(v)/T(v)$ and $T_{mp}'(v)/T(v)$ standardized by the basic clock period $T(v)$ and the actual irradiation times $T_{mp}(v)$ and $T_{mp}(v)$ have inverse relationships with respect to a change in the scanning velocity (i.e. the duties increase and the actual times decrease when the scanning velocity increases and vice versa).

Also, the irradiation times $T_{mp}$ and $T_{mp}'$ are preferably expressed by a function that is proportional to a function of the scanning velocity v: $\alpha=v/v_0$. More specifically, the irradiation times $T_{mp}$ and $T_{mp}'$ are preferably expressed by a function $T_{mp}(\alpha)/T(\alpha)=a\times\alpha+b$. Herein, $v_0$ denotes the minimum scanning velocity at which recording is possible in an optical information recording medium, α denotes a real number greater than or equal to 1. The range of α represents the range of the scanning velocity at which recording is possible in the optical information recording medium. For example, in the case of a disk type recording medium with a diameter of 120 mm that uses the CAV (Constant Angular Velocity) method, the above range is preferably set to $1 \leq \alpha \leq 2.4$; more specifically, $1 \leq \alpha \leq 4$.

Figure 8:
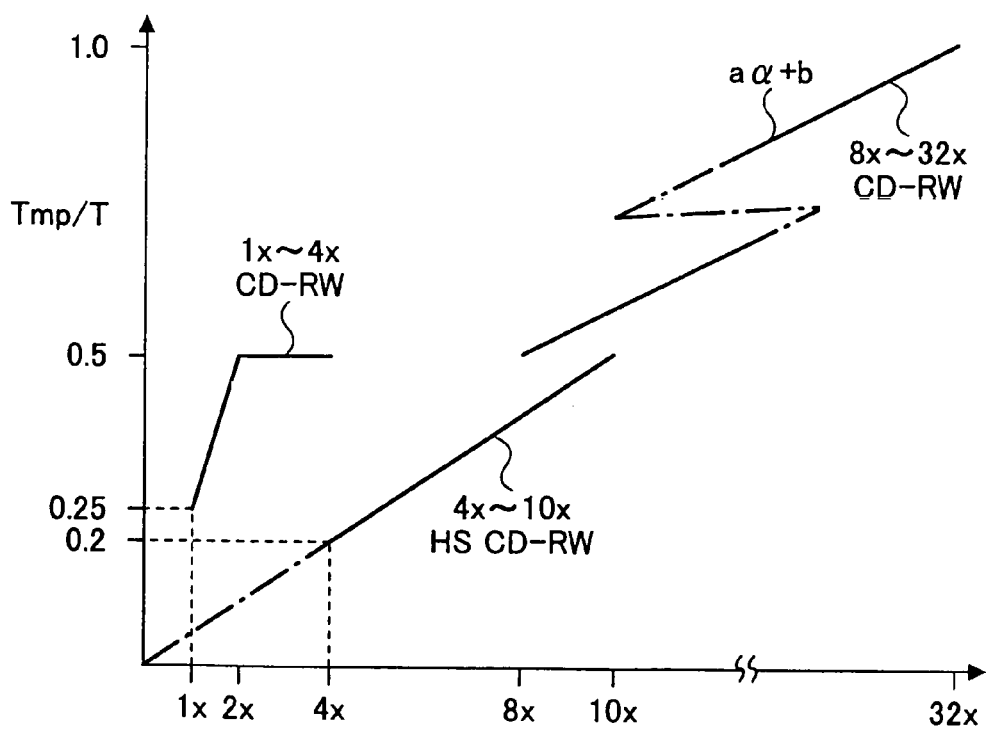
FIG. 8 shows functions that change the duty of the irradiation time in response to the change in the scanning velocity.

FIG. 8 shows the functions that change the duty of the irradiation time in response to a change in the scanning velocity. In the case of a CD-RW, wherein $L_0=278$ nm and the scanning velocity $v=9.6$ m/s–38.4 m/s=8x–32x $v_0=9.6$ m/s=8x, $\alpha=1$–4), which is particularly pertinent to the present embodiment, it is preferable that $0.14 \leq a \leq 0.29$ and $0.2 \leq b \leq 0.4$. In this diagram, the characteristics of a duty $T_{mp}/T$ of a CD-RW with a scanning velocity of 1x-4x ($v_0=1.2$ m/s, $\alpha=1$-4) and the characteristics of a duty $T_{mp}/T$ of a HS CD-RW with a scanning velocity of 4x-10x ($v_0=4.8$ m/s, $\alpha=1$-2.5) are also shown. Additionally, although not shown, in the case of a DVD+RW, $v_0=3.49$ m/s, and $\alpha=1$-2.4.

The constants a and b can be set according to the characteristics of the optical information recording medium; however, the constants are preferably set to:

$$0.1 \leq a \leq 0.4$$

$$0.1 \leq b \leq 0.4$$

By setting the constants according to the above restrictions, the present embodiment can be arranged to be compatible with the recording strategies conceived for $\alpha=1$ through 4.

The irradiation time $T_{mp}'$ when n=3 also changes according to α. Thus, based on the above function, the value calculated from the formula shown below can be used:

$$T_{mp}'(\alpha)=(T_{mp}(\alpha)/T_{mp}(1)) \times T_{mp}' \qquad (1)$$

Thus, according the information recording method of the present embodiment, the power Pw does not change significantly even when α is changed since the pulse irradiation time $T_{mp}$ is made relatively shorter with respect to the basic clock period. Thereby, this method is suitable for use in CAV recording, or Z-CLV (Zone-Constant Linear Velocity) recording in which CLV recording is performed for each radial range so that pseudo-CAV recording is realized (when the radial range takes the limiting value of 0, the Z-CLV recording corresponds to the CAV recording).

(Pre-Formatting on the Optical Information Recording Medium)

As described above, it is possible to determine a recording method according to a complex recording strategy using a limited number of parameters. By pre-formatting the information corresponding to these parameters, the information recording apparatus is able to read the information of the parameters from the relevant optical information recording medium so as to establish highly accurate recording conditions.

One of the primary features of the present embodiment is that the parameter information is preformatted on the optical information recording medium.

The above pre-formatting can be performed according to any type of pre-formatting method. The various methods of pre-formatting are: the pre-pit method, the wobble encoding method, and the formatting method. The pre-pit method is a method of pre-formatting information concerning the recording conditions using a ROM pit in any given area of the optical information recording medium. This method is advantageous in that high productivity can be realized since the ROM pit is formed along with the formation of the substrate, and also, high reproducing reliability and large information capacity can be provided. However, there are still many problems that need to be solved concerning the technology for forming a ROM pit (i.e. hybrid technology) and the pre-formatting technology using a RW pre-pit is still considered to be quite difficult.

The formatting method is a method of recording information using the same method for normal recording in the optical information recording apparatus. However, with this method, information has to be formatted onto each optical information recording medium after its fabrication, thereby lowering productivity. Further, since the information formatted according to this method will be re-writable, this method is not suitable for recording characteristic information of the recording medium.

The wobble encoding method is the method that is actually used in the pre-formatting of the CD-RW and the DVD+RW. This method uses a technology of encoding address information of the optical information recording medium in a grove (guiding trench in the recording medium) wobble. The encoding method may be a frequency modulation used for the ATIP (Absolute Time in Pregroove) in a CD-RW or a phase modulation used in the DVD+RW. In the wobble encoding method, the groove wobble is formed on a substrate of the optical information recording medium along with the address information upon the formation of the substrate, this leading to increased productivity. Also, unlike the pre-pit method where a special ROM pit has to be formed, the wobble encoding method does not require such special measure, thereby facilitating the formation of the substrate.

Figure 9:
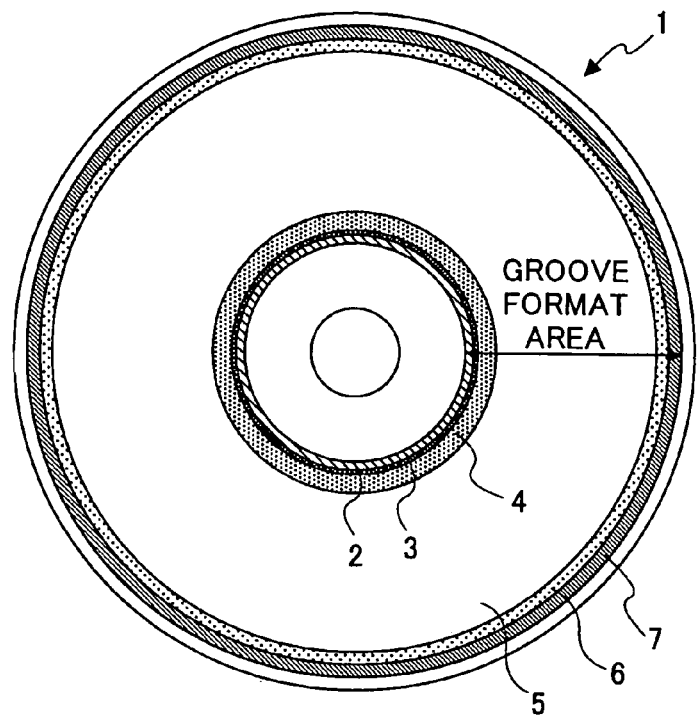
FIG. 9 shows a plan view of an area distribution of an optical information recording medium.
Figure 10:
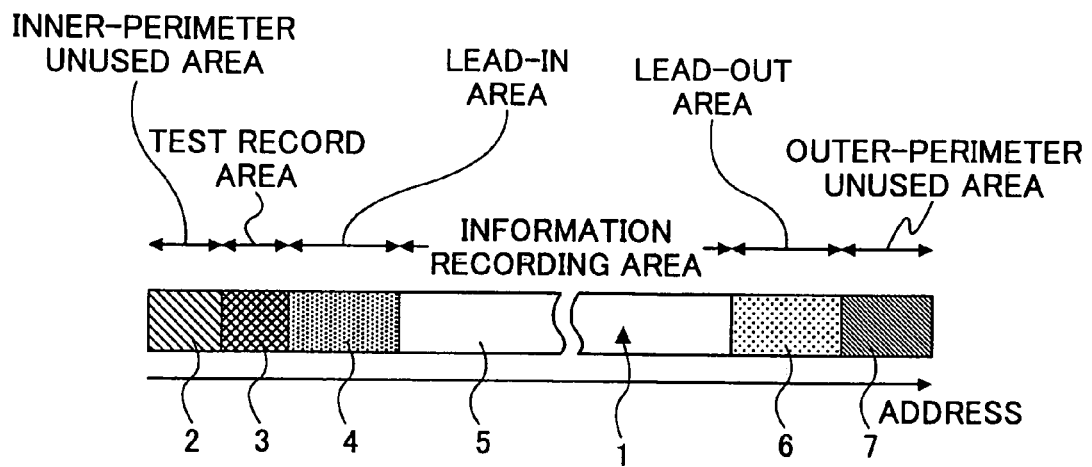
FIG. 10 shows a cross-sectional view of the structure of FIG. 9.

In the following, the above described pre-formatting method of the parameters relating to the recording strategy performed in the CD-RW will be described. FIGS. 9 and 10 show an exemplary format of each of the areas of an optical information recoding medium 1 according to the CD-RW standard. In the groove formed area of the disk-shaped optical information recording medium 1, an inner-perimeter unused area 2, a test recording area 3, a lead-in area 4, an information recording area 5, a lead-out area 6, and an outer-perimeter unused area 7 are assigned.

In the optical information recording medium 1 (CD-RW) having the above configuration, the media information (parameter information) that is to be pre-formatted on the recording medium is in the form of ATIP (Absolute Time In Pregroove) Extra Information. ATIP is the address information pre-formatted on the CD-RW disk. Owing to the fact that the CD started out as a sound information recording medium, its address information is represented as time information, that is, the information is represented as M:S:F. Herein M stands for minutes, and the value of M is within a range of 00-99. S stands for seconds, and its value is within a range of 00-59. F stands for frames, and its value is within a range of 00-74. Also, note that 1 M=60 S, and 1 S=75 F. Information of eight bits is assigned to each of M, S, and F, thereby information of one ATIP frame will be 24 bits. Although each of M, S, and F may potentially have a value within a range of 0-255, the values that are actually used are within the ranges mentioned above. Thus, the unused bits can be used to format additional information other than address information. The ATIP Extra Information pre-formatting method is a method that uses the above unused bits to pre-format additional information.

Figure 11:
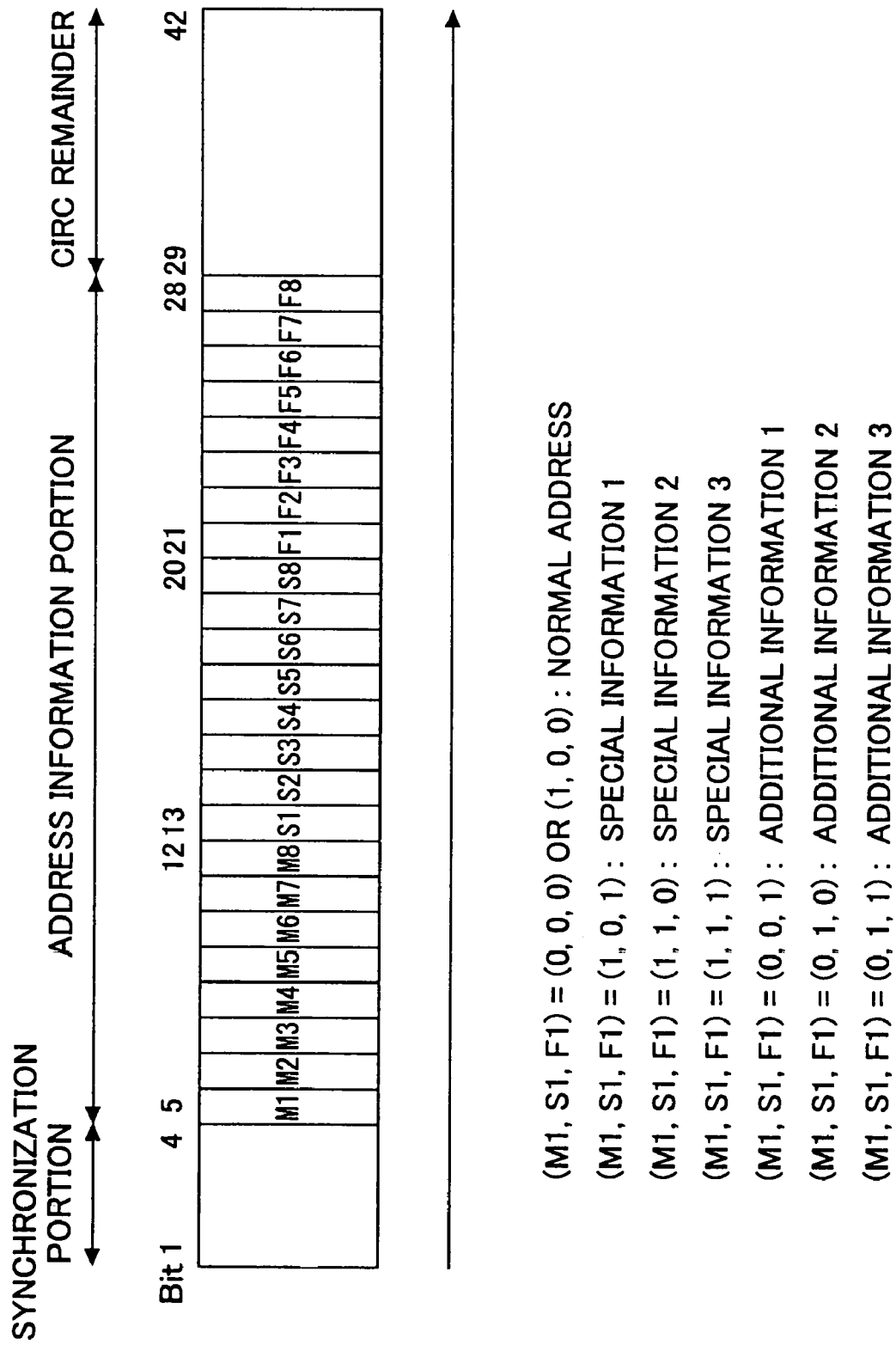
FIG. 11 shows a data format of an ATIP frame.

In FIG. 11, a data format of one ATIP frame, which consists of 42 bits, is shown. The first four bits of the ATIP frame are called the synchronization portion, which indicates the beginning of the frame. Upon reproducing the ATIP, the information recording apparatus recognizes this synchronization portion as the beginning of the frame. Therefore, the synchronization portion is made of a special pattern called the synchronization pattern. The 24 bits from the $5^{th}$ to $28^{th}$ bits following the synchronization portion are the address information portion. The 24 bits are further divided into three 8-bit portions. The portions M1-M8 represent the address information of M (i.e. minutes), the portions S1-S8 represent the address information of S (i.e. seconds), and the portions F1-F8 represent the address information of F (i.e. frames). The 14 bits from the $29^{th}$ bit to the $42^{nd}$ bit following the address information portion are the so-called 'CIRC remainder' portion, which corresponds to error correction codes using the CIRC (cross-interleaved Reed Solomon code).

According to the CD-RW standard, the address information portion content is divided into seven types depending on the respective values of M1, S1, and F1, as shown below and in FIG. 11:

(M1, S1, F1)=(0, 0, 0) or (1, 0, 0): Normal Address
(M1, S1, F1)=(1, 0, 1): Special Information 1
(M1, S1, F1)=(1, 1, 0): Special Information 2
(M1, S1, F1)=(1, 1, 1): Special Information 3
(M1, S1, F1)=(0, 0, 1): Additional Information 1
(M1, S1, F1)=(0, 1, 0): Additional Information 2
(M1, S1, F1)=(0, 1, 1): Additional Information 3

Herein, information other than the 'normal address' correspond to the ATIP Extra Information. This ATIP Extra Information contains characteristic information of the disk such as the type of disk, and recording conditions (i.e. recording power, parameters for setting the optimum recording power, parameters for determining the recording strategy, etc.) of the disk.

The ATIP Extra Information is placed at the lead-in area 4 of the optical information recording medium 1, preceded by nine consecutive frames of the normal address information. That is, to reproduce the six types of ATIP Extra Information, at least 60 frames of the lead-in area 4 need to be reproduced.

In the following, the pre-formatting of the parameters for determining the recording strategy on the optical information recoding medium 1 using the eight types of parameters, $T_{d1}/T$, $T_{d2}/T$, $T_{d2}'/T$, $T_{mp}/T$, $T_{mp}'/T$, $\delta_1 O$, $\delta_2$, and $\delta_3$, standardized by the basic clock period T, in accordance with the information recording method of the present embodiment will be contemplated. It is assumed that the parameter information corresponds to Additional Information 1 and Additional Information 2 of the ATIP Extra Information.

Figure 12:
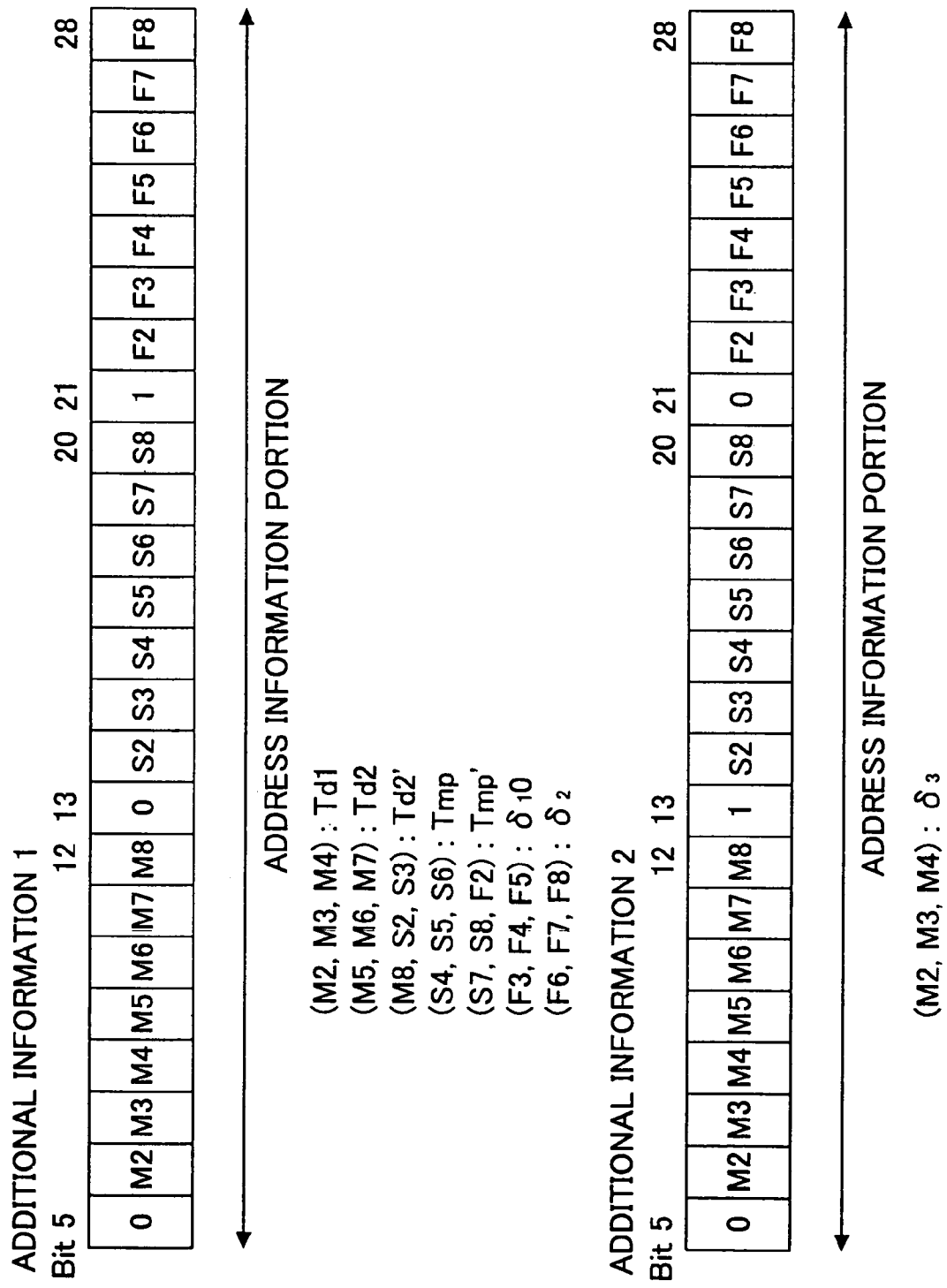
FIG. 12 shows pre-format areas assigned to each parameter in an address information portion.

The Additional Information 1 has fixed values for M1, S1, and F1, which are set to 0, 0, 1, respectively, and the Additional Information 2 has fixed values for M1, S1, and F1, which are set to 0, 1, 0, respectively. Thereby, the address information portion will have states as shown in FIG. 12. In turn, each of the other bits is assigned to represent the following parameters:

Additional Information 1
(M2, M3, M4): $T_{d1}/T$
(M5, M6, M7): $T_{d2}/T$
(M8, S2, S3): $T_{d2}'/T$
(S4, S5, S6): $T_{mp}/T$
(S7, S8, F2): $T_{mp}'/T$
(F3, F4, F5): $\delta_1 O$
(F6, F7, F8): $\delta_2$ Additional Information 2
(M2, M3, M4): $\delta_3$ In this example, information worth three bits is assigned to each parameter. That is, information of eight levels is assigned to each parameter. The conversion of each of the bits into a parameter value (real number) is performed by referring to a conversion table. FIGS. 14-21 show exemplary conversion tables 11*a*-11*h* showing the relationship between each of the parameters and its corresponding bits.

For example, it is assumed in the following description that optimum recording characteristics can be realized in a given optical information recording medium 1 with the parameter values shown below:

$T_{d1}/T=0.50$
$T_{d2}/T=0.00$
$T_{d2}'/T=0.25$
$T_{mp}/T=1.00$ $T_{mp}'/T=1.06$
$\delta_1 O=0.38$
$\delta_2=0.25$
$\delta_3=0.28$ Accordingly, the corresponding bit number of each bit obtained based on the tables 11a-11h shown in FIGS. 14-21 will be as follows:

Additional Information 1
(M2, M3, M4)=(0, 1, 1)
(M5, M6, M7)=(1, 0, 0)
(M8, S2, S3)=(1, 0, 1)
(S4, S5, S6)=(1, 0, 0)
(S7, S8, F2)=(1, 0, 1)
(F3, F4, F5)=(0, 1, 0)
(F6, F7, F8)=(0, 0, 1)

Additional Information 2
(M2, M3, M4)=(1, 0, 0)

Figure 13:
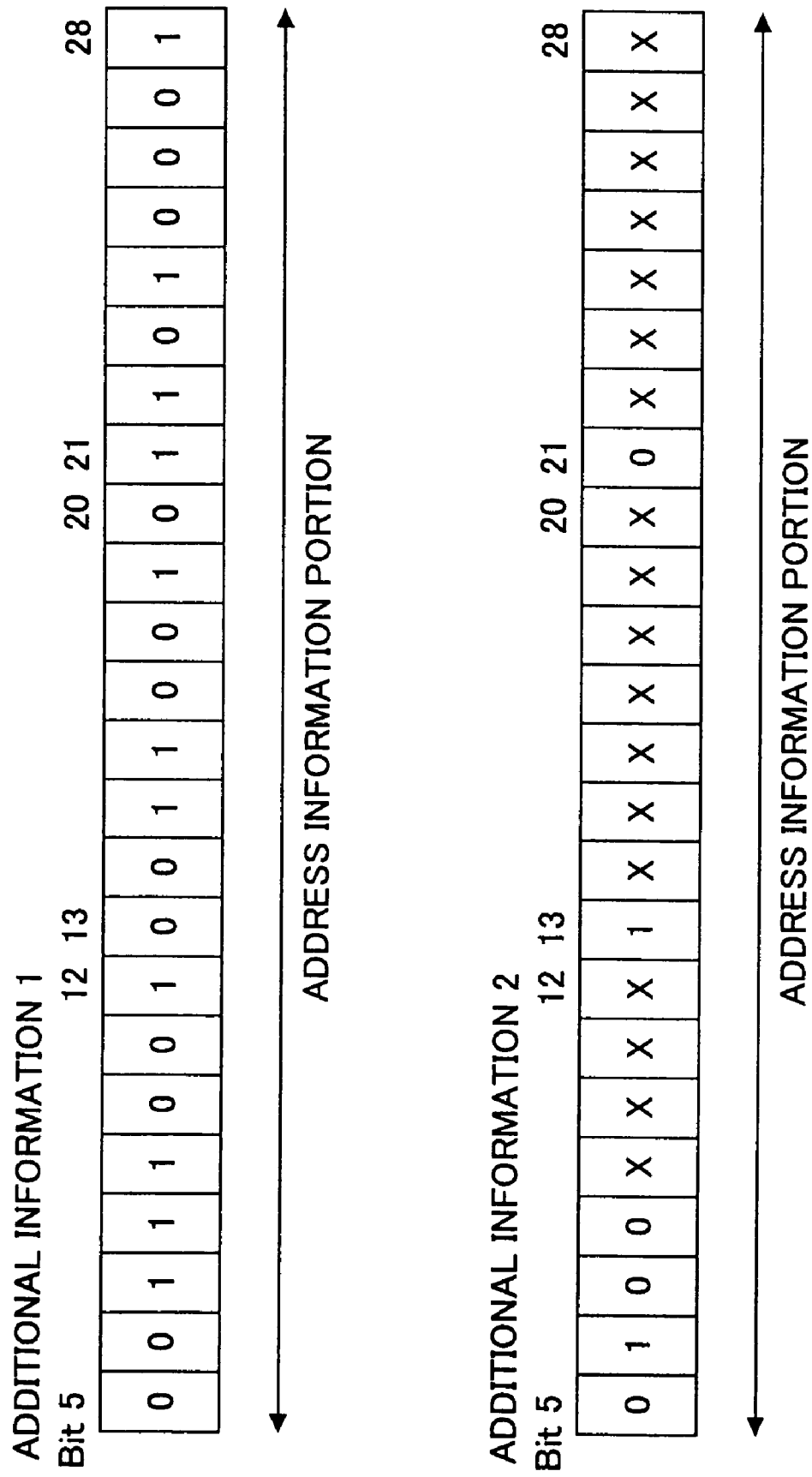
FIG. 13 shows examples of pre-formatted bit information.

In FIG. 13, the bit information of each of the parameters pre-formatted in the Additional Information 1 and the Additional Information 2 according to the above example is shown. (Herein, X represents undefined information and can therefore take any value.)

When the optimum values for the parameters relating to the determination of the recording strategy are different from the above due to a difference in physical properties in the recording layer and the like, the corresponding bit information for the changed parameters can be pre-formatted to the Additional Information 1 and Additional Information 2 using the conversion tables 11a-11h.

According to the wobble encoding method, the absolute information capacity tends to be lower than that realized by the other pre-formatting methods. Normally, the wobble frequency is within a frequency band that will not cause mutual interference with the frequency of the recording information. That is, a frequency below 1/30, and preferably below 1/100 of the frequency of the recording information. The information density decreases even further when frequency modulation is performed. Also, the information density decreases when the redundancy in the address information is used as in the ATIP Extra Information pre-formatting for the CD-RW.

When there is a shortage of information capacity, a new area can be created. In the case of a CD-RW, the ATIP Extra Information is normally encoded in the lead-in area 4. However, when this area alone cannot hold all the information, the ATIP Extra Information may be encoded in the inner-perimeter unused area 2 or the outer-perimeter unused area 7 of the disk. Examples of the unused areas 2 and 7 are the areas of the disk situated closer to the inner circumference than the PCA (Power Calibration Area=test recording area 3) and the areas of the disk situated closer to the outer circumference than the lead-out area 6.

Also, as described above, the encoding of the parameter may involve encoding a binary number converted from a real number or encoding information converted by a conversion table. However, in either case, means for decoding the information encoded on the medium to appropriately set the recording strategy need to be provided in the information recording apparatus.

(Recording Strategy Generation Method)

An information recording apparatus compatible with a CD-RW as the optical information recording medium 1 reproduces the ATIP Extra Information upon executing a recording operation on this optical information recording medium 1 (including the mounting of the medium). The above recording apparatus compatible with the optical information recording medium 1 (CD-RW) has to be able to reproduce the Additional Information 1 and also needs to have the conversion tables for converting the bits of the Additional Information 1 into real numbers. The information recording apparatus reproduces the Additional Information 1 and the Additional Information 2 and acquires the values of each bit from the optical information recording medium 1. Then the information recording apparatus obtains the parameter values from the above bit information using the conversion tables 11a-11h, and determines the optimum recording strategy based on the real numbers of the above parameters. According to this method, the information recording apparatus is able to determine an optimum recording strategy for each optical information recording medium. Thereby when an optical information recording medium 1 with a different optimum recording strategy is used, that is, when the optical information recording medium 1 has different parameter values, the bit information corresponding to the parameters for determining the optimum recording strategies for this particular optical information recording medium 1 is preformatted in the Additional Information 1 and the Additional Information 2, and the information recording apparatus is able to set an optimum recording strategy for this optical information recording medium 1.

Figure 22:
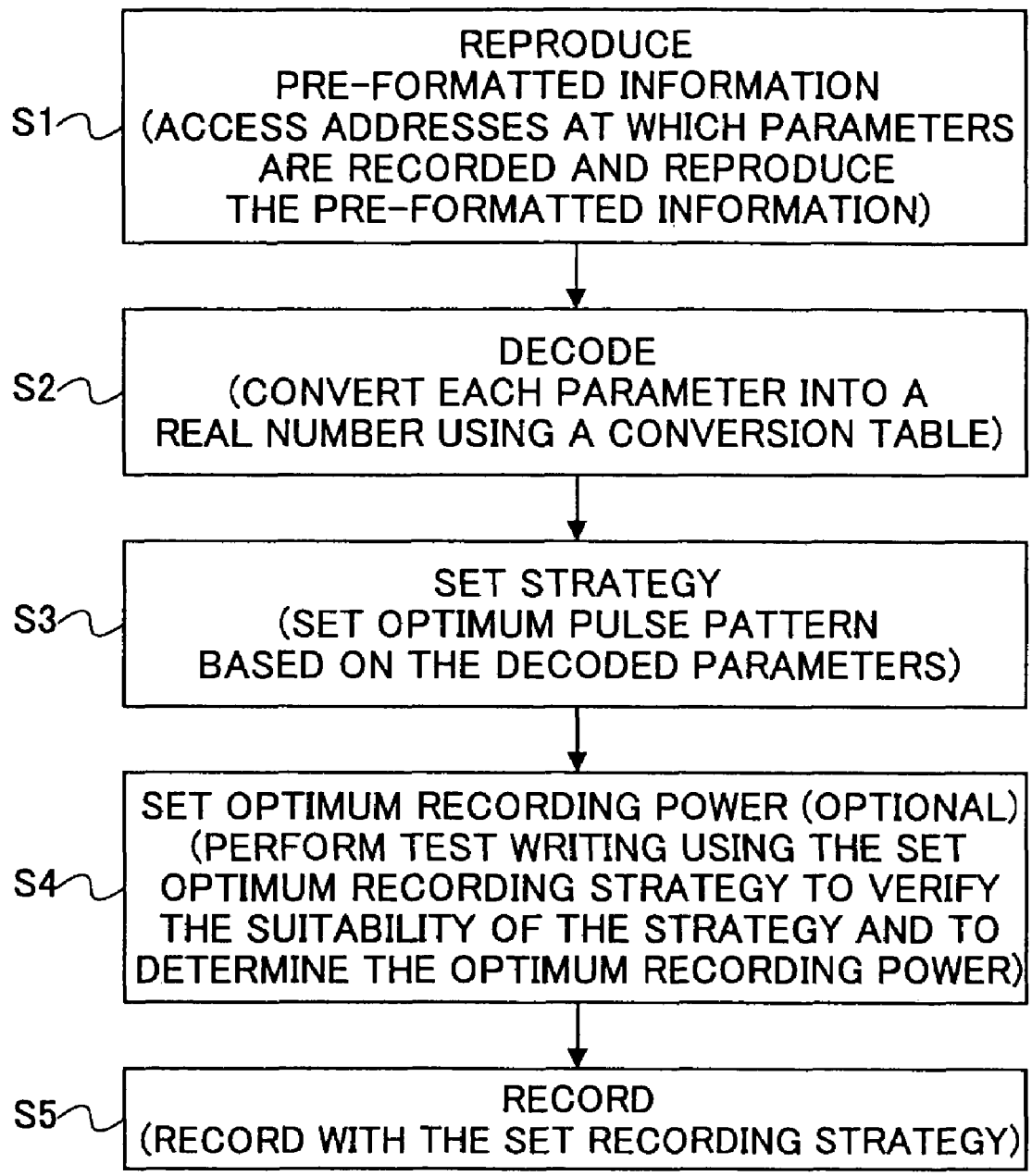
FIG. 22 shows a flowchart of a recording strategy generation process.

FIG. 22 shows a summary flowchart of the processing procedures of the above recording strategy generation method. These processes are executed by a system controller (to be described later) of the information recording apparatus, for example.

First of all, before initiating the recording operation, the preformatted information is reproduced from the optical information recording medium 1 that is mounted on the recording apparatus (step S1). In other words, this process involves accessing the addresses in which the parameters relating to the determination of the recording strategy, namely, $T_{d1}/T$, $T_{d2}/T$, $T_{d2}'/T$, $T_{mp}/T$. $T_{mp}'/T$, $\delta_1 O$, $\delta_2$, and $\delta_3$, are recorded and reproducing the preformatted information. Then, the reproduced preformatted information (bit information of the parameters $T_{d1}/T$, $T_{d2}/T$, $T_{d2}'/T$, $T_{mp}/T$. $T_{mp}'/T$, $\delta_1 O$, $\delta_2$, and $\delta_3$) are decoded (step S2). That is, each item of the parameter information is converted from bit information to real number information using the conversion tables 11a-11h. Then, the optimum recording strategy is generated and set by referring to the real number information of the converted parameters $T_{d1}/T$, $T_{d2}/T$, $T_{d2}'/T$, $T_{mp}/T$. $T_{mp}'/T$, $\delta_1 O$, $\delta_2$, and $\delta_3$, so that an optimum multi-pulse sequence pattern can be created (step S3). After this step, a process of setting the optimum recording power is performed on the appropriate occasion (step S4). This corresponds to the process of performing test writing using the determined optimum recording strategy to verify the suitability of the strategy and to determine the optimum recording power. An example of the test writing process is the OPC (Optimum Power Control) used in the CD-R/RW and the DVD+RW/R. In the recording operation, the recording power determined according to the above mentioned procedures is used to perform recording based on a predetermined recording strategy (step S5).

(Information Recording Apparatus)

Figure 23:
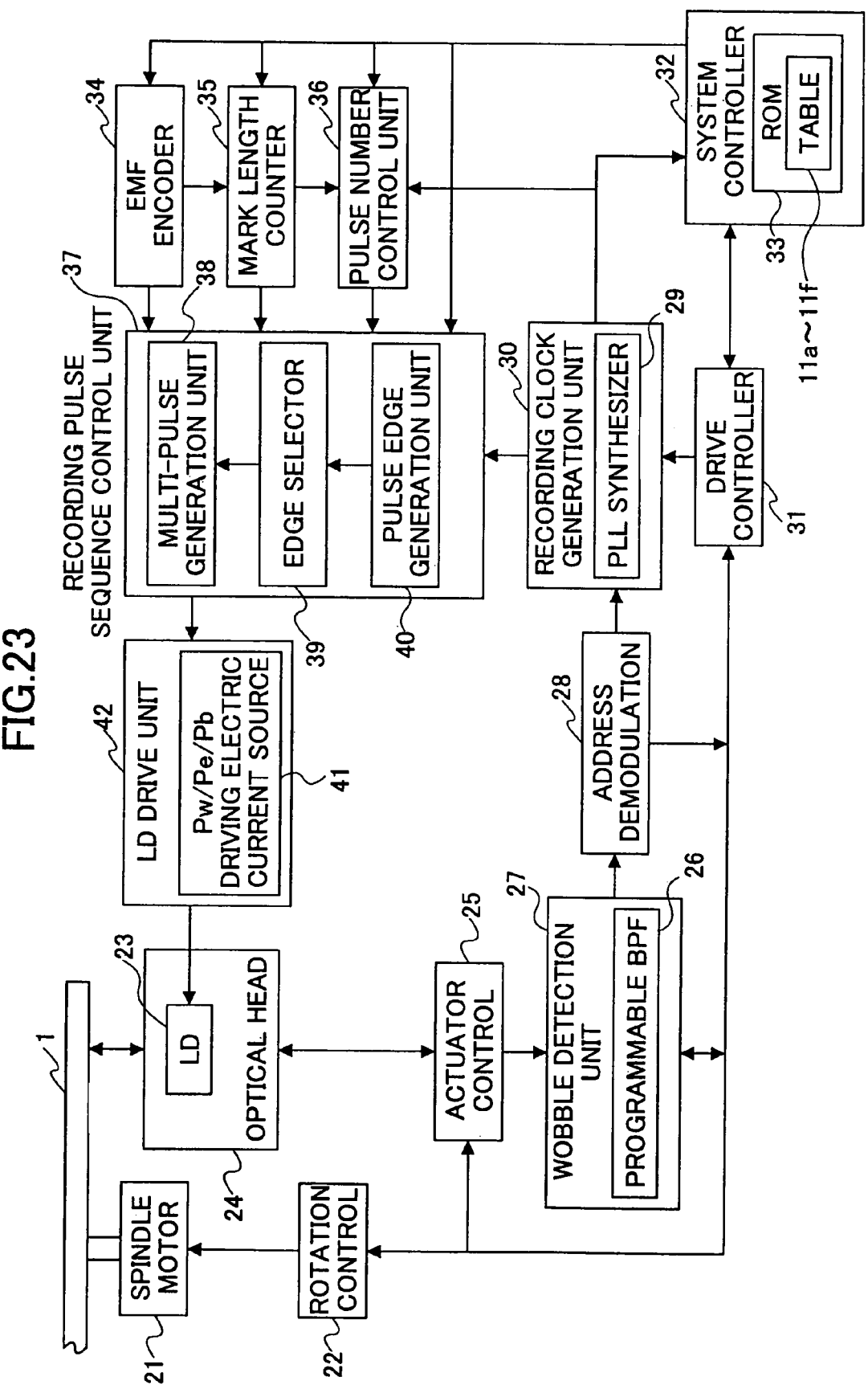
FIG. 23 is a block diagram showing a configuration of an information recording apparatus.

FIG. 23 shows an exemplary configuration of the information recording apparatus used in order to realize the information recording method based on the above recording strategy.

The information recording apparatus has a rotation control structure 22 that includes a spindle motor 21 that rotates the optical information recording medium 1, and an optical head 24 that has an objective lens that irradiates and condenses a laser beam on the optical information recording medium 1 and a laser light source such as a semiconductor laser diode LD 23, wherein the optical head 24 is arranged to be movable along the disk radius direction to seek an address. An actuator control structure 25 is connected to an objective lens drive and a power range system of the optical head 24. A wobble detection unit 27 that includes a programmable BPF 26 is connected to this actuator control structure 25. An address demodulation circuit 28 that demodulates address information from a detected wobble signal is connected to this wobble detection unit 27. A recording clock generation unit 30 that includes a PLL synthesizer circuit 29 is connected to this address demodulation circuit 28. A drive controller 31 functioning as speed controlling means is connected to the PLL synthesizer circuit 29.

The drive controller 31, which is connected to a system controller 32, is also connected to the rotation control structure 22, the actuator control structure 25, the wobble detection unit 27, and the address demodulation circuit 28.

Further, the system controller 32 has a so-called Micom structure that implements a CPU and the like. This system controller 32 has a ROM 33 that contains the above described conversion tables 11a-11h. Also, an EFM encoder 34, a mark length counter 35, and a pulse number control unit 36 are connected to the system controller 32. Further, a recording pulse sequence control unit 37 that functions as light emission waveform control means is connected to the EFM encoder 34, the mark length counter 35, the pulse number control unit 36, and the system controller 32. This recording pulse sequence control unit 37 includes a multi-pulse generation unit 38 that generates a multi-pulse (on pulse, off pulse) sequence designated by the recording strategy, an edge selector 39, and a pulse edge generation unit 40.

Also, a LD drive unit 42 is connected to the output side of this recording pulse sequence control unit 37. The LD drive unit 42 functions as light source driving means that activates the semiconductor laser diode LD 23 in the optical head 24 by switching a driving electric current source 41 corresponding to each of the recording power Pw, the erasing power Pe, and the bias power Pb.

In the following, the procedures for realizing a recording process on the optical information recording medium 1 using the information recording apparatus having the above described configuration will be described.

First, the rotation control structure 22 controls the rotation (number of rotations) of the spindle motor 21 so that the recording line speed corresponds to the desired recording speed, this being done under the control of the drive controller 31. Then, an address is demodulated from a wobble signal detected and separated from a push-pull signal obtained from the optical head 24 by means of the programmable BPF 26, and at the same time, a recording channel clock is generated by the PLL synthesizer circuit 29. Next, the recording channel clock and EFM data that contains recording information are input to the recording pulse sequence control unit 37. Then a multi-pulse sequence in accordance with a recording strategy shown in FIG. 4, for example, is generated by means of the multi-pulse generation unit 38 in the recording pulse sequence control unit 37. Then, at the LD drive unit 42, each driving electric current source 41 for setting the irradiation power to Pw, Pe, and Pb, respectively is switched on so that a LD light emission waveform that corresponds to a recording pulse sequence is generated. In turn, the recording pulse sequence is generated at the semiconductor laser diode LD 23.

Note that according to the present embodiment, a multi-level pulse edge generation unit 40 that has a resolution that is 1/20 of the recording channel clock period is implemented in the recording pulse sequence control unit 37, wherein the generated edge pulses are input to an edge selector (multiplexer) 39 after which an edge pulse is selected by the system controller 32 according to the parameter $T_{d1}$ so that a first pulse rise control signal and the like are generated. A multi-level delay circuit for the pulse edge generation unit 40 may be composed of a gate delay element with a high resolution or a ring oscillator and a PLL circuit.

Using the above first pulse rise control signal as a basis, a multi-pulse sequence that is in synchronization with the basic clock period T is generated based on the parameters such as $T_{mp}$, $T_{mp}'$, $\delta_1 O$, $\delta_2$, and $\delta_3$. Similarly, with respect to the last off pulse irradiation time $T_{off}$ (n, m), a last off pulse rise control signal is generated by the edge pulse selected by the system controller 32 based on the parameter $T_{d2}$ or $T_{d2}'$.

Also, in a recording pulse sequence control unit 37 according to the present embodiment, the mark length counter 35 for measuring the mark length of the EFM signal obtained from the EFM encoder 34 is provided. Herein a multi-pulse sequence is generated via the pulse number control unit 36 so that one set of pulses (on pulse with the power Pw and off pulse with the power Pb) is generated for every increase of 2T in the mark counter value. This operation is made possible by selecting the rear (or trailing) edge of the first pulse with the edge selector 39 after which the front (or leading) edge of the subsequent multi-pulse sequence is selected by the edge pulse generated from the next recording channel clock period, followed by the selection of the rear edge by the pulse edge generated from the next recording channel clock period.

Alternatively, the multi-pulse generation unit may have a configuration in which a recording frequency division clock that divides the recording channel clock into two is generated, from which an edge pulse is generated using a multi-level delay circuit, and one set of pulses (on pulse with the power Pw and off pulse with the power Pb) is generated for every increase of 2T in the recording channel clock by selecting the front and rear edges with the edge selector. In this configuration, the substantial operation frequency of the multi-pulse generation unit will be reduced to ½, thereby realizing an even higher recording speed.

(Modification)

Figure 24:
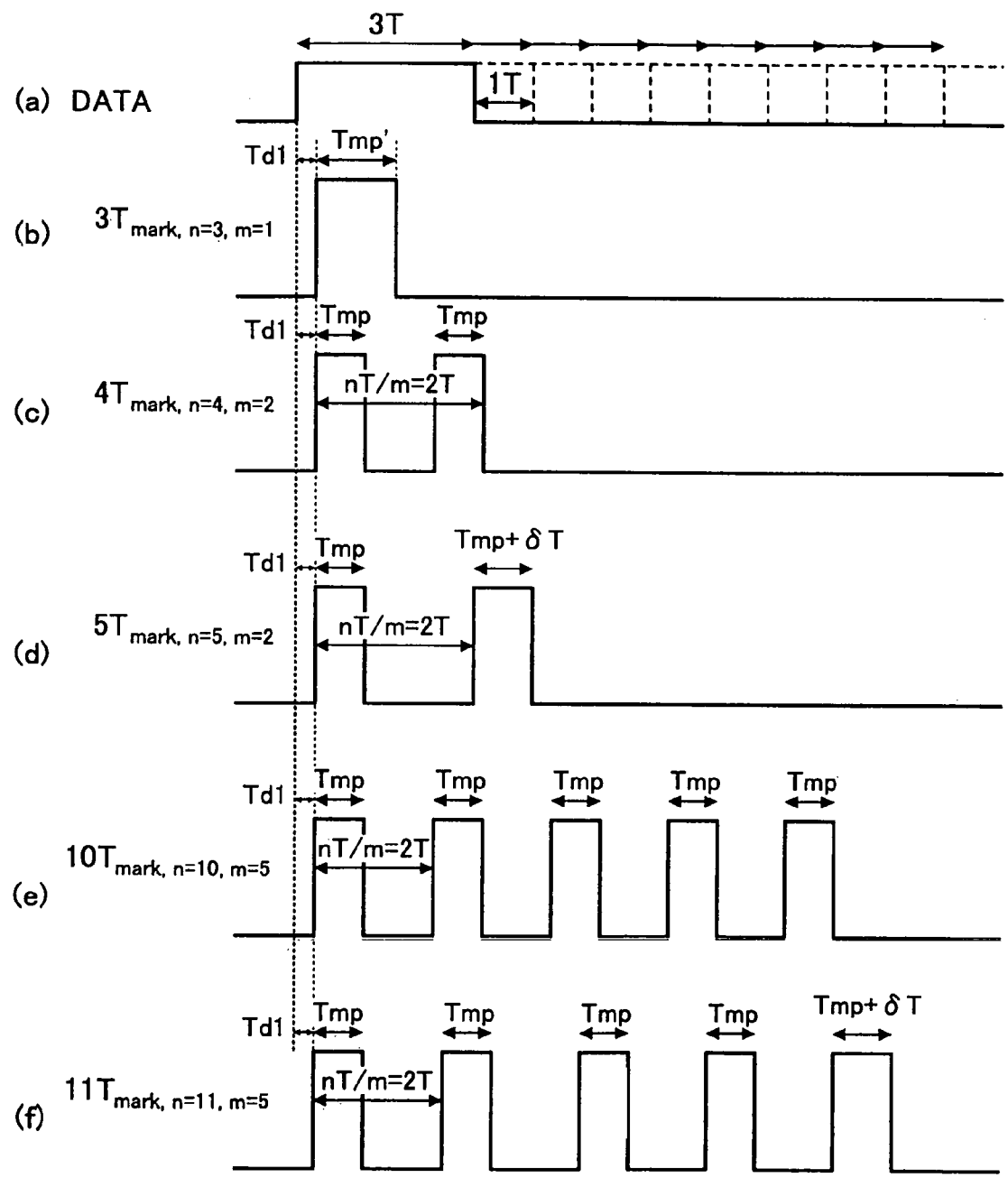
FIG. 24 shows exemplary waveforms of recording strategies according to a modified embodiment of the present invention.

In the above description of the preferred embodiments, the application of the present invention in a phase change type optical information recording medium is described. However, the present invention is also applicable in the so-called dye optical information recording medium that can be written only once such as the CD-R or DVD-R. In such case, the irradiation powers Pe and Pb are substantially equal (Pe≈Pb) and a bi-level pulse irradiation pattern will be realized wherein the irradiation power Pb is irradiated between the pulses $P_{on}$(n, i) and $P_{on}$(n, i+1) that are irradiated with the power Pw as shown in FIG. 24.

In the following, specific examples in accordance with the above descriptions of the present invention are given.

EXAMPLE 1

A lower dielectric layer, a recording layer, an upper dielectric layer, and a reflection layer are successively formed on a polycarbonate CD-RW substrate using the spattering method. A dielectric material made of ZnS with 20 mol % $SiO_2$ is used as the lower dielectric layer material and the upper dielectric layer material, and an AgInSbTe alloy with a very small amount of Ge added thereto is used as the recording layer material. Ag is used for the reflection layer material. The film thickness of each of the layers is: 70 nm for the lower dielectric layer, 15 nm for the recording layer, 20 nm for the upper dielectric layer, and 140 nm for the reflection layer. Further, a resin protective layer is formed on top of the above structure using a spin coating method. This protective layer is then hardened through irradiation of ultraviolet light. An ultraviolet activated resin, which is a protective layer material for a CD that is on the market, is used as the protective layer material. The film thickness of the resin protective layer is approximately 10 μm.

Right after the formation of the film layers, the recording layer is in a rapid cooling state and is thereby in an amorphous state. Thus, the CD-RW is initialized using a CD-RW initialization apparatus so as to crystallize the entire surface of the disk. The initialization is realized by irradiating and scanning high energy laser throughout the entire surface of the disk. The initialization laser has a wavelength of 830 nm and its beam diameter is 1 μm in the scanning direction and 80 μm in the direction perpendicular to the scanning direction. The irradiation intensity is 800 mW (power consumption) and the scanning velocity is 2.5 m/s. The disk produced according to the above specifications satisfies the standards of the CD-RW disk in an unrecorded state.

A recording experiment in which recording equivalent to a 24× speed recording on a CD is performed in the above disk. In this experiment, a DDU-1000 by Pulstec Industrial Co., Ltd. is used as the information recording/reproducing apparatus, and an AWG 610 (Arbitrary Waveform Generator) by Sony/Tektronix Corporation is used as a recording strategy generation apparatus. The resulting recording strategy patterns have configurations identical to those shown in FIG. 4 and the parameters are set as follows:

T=9.6 ns
$T_{mp}/T=1.125$
$T_{mp}'/T=1.563$
$\delta_1 O=0.30$
$\delta_2=0.30$
$\delta_3=0.125$
$T_{d1}/T=0.50$
$T_{d2}/T=0.05$
$T_{d2}'/T=0.10$ When the 24× speed recording is performed using the recording strategy according to the above parameters, the following recording conditions are obtained:
Pw=32 mW
Pe=11 mW
v=28.8 m/s
DOW count=1-1000

(DOW: Direct Over Write, a rewrite that is not accompanied by an erasing operation; the rewrite can be performed at least 1000 times according to the CD-RW standard)

Table 1 shown below shows the results from measuring the 3T mark jitter and the 3T mark space jitter at a normal speed (v=1.2 m/s) after the recording.

TABLE 1

| DOW Count | 3T Mark Jitter (ns) | 3T Space Jitter (ns) |
|---|---|---|
| 0 | 16 | 20 |
| 1 | 27 | 31 |
| 10 | 24 | 28 |
| 1000 | 28 | 33 |

According to the results shown in table 1, it can be determined that the disk on which the experiment is performed satisfies the CD-RW standard which sets a condition for the jitter to be less than 35 ns (jitter<35 ns) when the DOW is performed 1000 times or less.

EXAMPLE 2

Recording equivalent to an 8× speed recording on a CD is performed on the CD-RW disk of Example 1. As for the recording strategy, only the parameters $T_{mp}/T$ and $T_{mp}'/T$ are changed to:
$T_{mp}/T=0.500$ (4/9 of Example 1)
$T_{mp}'/T=0.695$ (4/9 of Example 1)
T=28.9 ns The values for the rest of the parameters, $\delta_1 O$, $\delta_2$, $\delta_3$, $T_{d1}/T$, $T_{d2}/T$, and $T_{d2}'/T$ are arranged to have the same values as Example 1. Consequently, the recording conditions will be as follows:
Pw=30 mW
Pe=9 mW
v=9.6 m/s v DOW count=1-1000 times Table 2 (shown below) shows the results from measuring the 3T mark jitter and the 3T mark space jitter at normal speed after the recording.

TABLE 2

| DOW Count | 3T Mark Jitter (ns) | 3T Space Jitter (ns) |
|---|---|---|
| 0 | 15 | 17 |
| 1 | 25 | 28 |
| 10 | 22 | 25 |
| 1000 | 24 | 28 |

From the results shown in the above table 2, it can be determined that the 8× speed recording is realized by simply reducing the irradiation time $T_{mp}$ and $T_{mp}'$ to 4/9 of that in Example 1. Also, the jitter is below 35 ns even when the DOW count reaches 1000 times, meaning good characteristics are realized.

EXAMPLE 3

Taking the Embodiments 1 and 2 into consideration, the information recording apparatus will be able to determine the optimum recording strategy by pre-formatting the parameter information shown below on the optical information recording medium 1.

$\delta_1 O=0.30$
$\delta_2=0.30$
$\delta_3=0.125$
$T_{d1}/T=0.50$
$T_{d2}/T=0.05$
$T_{d2}'/T=0.10$
a=3.125
b=0.188
α=3

In the following, the various advantages of the present invention will be described.

First, according to the present invention, a recording strategy is used to form a recording mark with a multi-pulse sequence, which is increased by one pulse with an irradiation power Pw for every increase of 2T in the temporal length nT. Thus, the irradiation time per pulse can be made longer with respect to the basic clock period T, which in turn can reduce the influence from the time required for the rise of the pulse light. Also, a high modulation rate at a low recording power can be realized and jitter can be reduced. Particularly, when n is an odd number and n≧7, a period from the fall of the first pulse to the fall of a second pulse in the multi-pulse sequence is arranged to be greater than 2T, and a period corresponding to the last pulse is set to $(2+\delta_1 O)T$ where the value of $\delta_1 O$ is optimized within the range of $0<\delta_1 O \leq 1$. Thus, the multi-pulse sequence is adjusted from both the front pulse side and the rear pulse side so that an overall consistency can be maintained in the mark shape upon recording the mark, whereas, in a case where the multi-pulse is adjusted only from the rear pulse side, the consistency of the mark shape can be severely degraded. Accordingly, a distortion in the waveform of the reproducing signal can be prevented and the jitter characteristic can be improved. Also, when $n \geq 4$, the fall of the first pulse is synchronized with a basic clock, and the fall of the second pulse and the rest of the pulses except for the last pulse are also synchronized with the basic clock by irradiating the pulses at periods of 2.5T or 2T. In this way, the design of a recording strategy generation circuit that generates the actual recording strategy can be simplified.

Further, the period from the fall of the first pulse to the fall of the second pulse when n is an odd number and $n \geq 7$ may typically be set to 2T.

Whether n is odd or even, parameters that have little influence on the recording characteristics are made to conform to a uniform parameter so that the optimum recording strategy can be accurately determined with few parameters.

Also, when n is an even number and $n \geq 6$, the periods of the pulses other than the first pulse may all be set to 2T so that the parameters for determining the recording strategy can be reduced even further.

Further, by adjusting the parameters $T_{d1}$ and $\delta_2$ according to each optical information recording medium and determining the end of a space preceding a recording mark, the actual length of the mark and space and the transition area from space to mark can be optimized and jitter can be reduced.

The present invention is applicable to a dye type WORM (write once, read many) optical information recording medium, where two power levels are used in the recording.

Also, the present invention is applicable to a rewritable optical information recording medium made of a phase change recording material, where three power levels are used in the recording. In this case, a direct over write is made possible.

Additionally, by adjusting the parameters $T_{d2}$ and $T_{d2}'$ according to each optical information recording medium, the actual length of the mark and the space following the mark can be optimized and jitter can be reduced.

Also, by conforming the irradiation times of all the pulses, except for the pulse when n=3 and the last pulses when n is an odd number, to a uniform value, the parameters that have little influence on the recording characteristics are reduced so that the parameters for determining the optimum strategy can be reduced even further.

By fixing the parameters $T_{1p}$ and $T_{mp}$ regardless of the optical information recording apparatus, the parameters that have little influence on the recording characteristics are reduced so that the recording strategy generation circuit can be simplified.

Further, by changing only the duties $T_{mp}/T$ of the irradiation time of the pulses in response to a change in the scanning velocity of the recording, the recording strategy can be used for varying scanning velocities. Thereby, recording is possible in a wide range of scanning velocities using few parameters where jitter characteristics are improved. Particularly, by making the irradiation time $T_{mp}$ of a pulse with respect to the basic clock T relatively shorter with the decrease of the scanning velocity, the intensity of the power Pw does not have to be changed even when the scanning velocity is changed so that the recording strategy can be compatible with different scanning velocities.

Additionally, by arranging the irradiation time $T_{mp}$ to be in accordance with a function of α, the parameters for realizing the above information recording can be further optimized.

Also, by setting the irradiation time when n=3 to $T_{mp}'(v_H)/T_{mp}'(v_L)=T_{mp}(v_H)/T_{mp}(v_L)$, the irradiation time when n=3 is made to conform with the irradiation time when $n \geq 4$ with respect to the actual time. This measure is effective in reducing the parameters relating to the recording strategy.

Further, by fixing the parameters except for $T_{mp}$ and $T_{mp}'$ regardless of the scanning velocity, the recording strategy does not have to be changed even when the scanning velocity in the recording is changed. Thus, recording is possible over a wide range of scanning velocities using few parameters where jitter is improved.

Also, by pre-formatting the information of $\delta_1 O$ as parameter information relating to the recording strategy for determining the time $T_1 O$ from the fall of the second to last pulse to the fall of the last pulse on the optical information recording apparatus, the information recording apparatus will be able to set a recording strategy that satisfies the optimum recording conditions with ease.

The present application is based on and claims the benefit of the earlier filing dates of Japanese priority application No. 2002-136177 filed on May 10, 2002 and Japanese priority application No. 2002-266501 filed on Sep. 12, 2002, the entire contents of which are hereby incorporated by reference.

What is claimed is:

1. An information recording method for recording information on an optical information recording medium according to a mark length recording scheme in which a temporal length of a recording mark is represented as nT where n denotes a natural number and T denotes a basic clock period, said method comprising:

a recording mark forming step including forming a first recording mark corresponding to a temporal length of $n_1 T$ when $n=n_1=2m$ (where m denotes a natural number greater than or equal to two), and forming a second recording mark corresponding to a temporal length of $n_2 T$ when $n=n_2=2m+1$, the first recording mark and the second recording mark being formed by a multi-pulse sequence including m pulses having an irradiation power of Pw; and a recording strategy step including using a recording strategy to control the multi-pulse sequence during said recording mark forming step, the recording strategy involving setting an irradiation time of an $i^{th}$ pulse of the multi-pulse sequence (where i denotes a natural number within a range of one through (m−1)), which irradiation time is denoted as $T_{on}(n, i)$, to $T_{on}(n, i)$=constant $T_{mp}$ and $T_{on}(n_1, i)=T_{on}(n_2, i)$ when $n \geq 4$;

wherein when $n=n_2$, the multi-pulse sequence is controlled such that at least one irradiation period of the irradiation power Pw is greater than 2T, at least one inter-pulse time width between the pulses having the irradiation power Pw when $n=n_1$ differs from at least one inter-pulse time width between the pulses having the irradiation power Pw when $n=n_2$, and when differing scanning velocities $v=v_L$ and $v=v_H$ are used in recording (where $v_L<v_H$), basic clock periods for the scanning velocities $v_L$ and $v_H$ are denoted as $T(v)=T(v_L)$ and $T(v)=T(v_H)$, respectively, and a constant line density function $v_L \times T(v_L)=V_H \times T(v_H)$ is satisfied, an irradiation time upon recording at the scanning velocity $v_L$, denoted as $T_{mp}(v_L)$, satisfy conditions $T_{mp}(v_H)<T_{mp}(v_L)$ and $T_{mp}(v_H)/T(v_H)>T_{mp}(v_L)/T(v_L)$.

2. The information recording method as claimed in claim 1, wherein when a minimum scanning velocity for the recording is denoted as $v_0$, a basic clock period corresponding to the minimum scanning velocity $v_0$ is denoted as $T_0$, a given scanning velocity v is expressed as $v=\alpha \times v_0$ (where $\alpha$ is a real number greater than or equal to 1), and a corresponding basic clock period T is expressed as $T=T_0/\alpha$, the irradiation time $T_{mp}$ of a pulse is expressed as a function of $\alpha$, $T_{mp}(\alpha)/T(\alpha)=a\times\alpha+b$ (where a and b are constants, $0.1 \leq a \leq 0.4$, and $0.1 \leq b \leq 0.4$).

3. The information recording method as claimed in claim 1, wherein an irradiation time $T_{on}(3, 1)$ when n=3, denoted as $T_{mp}'(v)$, satisfies conditions $T_{mp}'(v_H)<T_{mp}'(v_L)$ and $T_{mp}'(v_H)/T(v_H)>T_{mp}'(v_L)/T(v_L)$.

4. The information recording method as claimed in claim 3, wherein a condition $T_{mp}'(v_H)/T_{mp}'(v_L)=T_{mp}(v_H)/T_{mp}(v_L)$ is satisfied.

5. The information recording method as claimed in claim 1, wherein light with an irradiation power Pb (where Pw>Pb) is irradiated between pulses $T_{on}(n, i)$ and $T_{on}(n, i+1)$ having the irradiation power Pw, light with an irradiation power Pe (where Pw>Pe>Pb) is irradiated to record a mark space, an irradiation start time of a first pulse of the multi-pulse sequence is delayed by a deviation time $T_{d1}$ with respect to a logical recording mark start time, when $n \geq 4$, a final off pulse with an irradiation power Pb (where Pw>Pb) is added after irradiation of a final pulse with the irradiation power Pw of the multi-pulse sequence, the final off pulse being switched to an irradiation power Pe (where Pw>Pe>Pb) at a time earlier than a logical data end time by a deviation time $T_{d2}$ (where $T_{d2}$ is a value independent of n and $-T \leq T_{d2} \leq T$), and the deviation times $T_{d1}$ and $T_{d2}$ for the scanning velocity v, denoted as $T_{d1}(v)$ and $T_{d2}(V)$, satisfy the conditions $T_{d1}(v)/T(v)=0.5$ and $T_{d2}(v)/T(v)$=fixed value independent of the scanning velocity v.

6. The information recording method as claimed in claim 5, wherein the deviation time $T_{d2}(v)$ when n=3, denoted as $T_{d2}'(v)$, satisfies a condition $T_{d2}'(v)/T(v)$=fixed value independent of the scanning velocity v.

7. The information recording method as claimed in claim 1, wherein when an irradiation time of a final pulse of the multi-pulse sequence when $n=n_2$ is denoted as $T_{on}(n_2, m)$ and $T_{on}(n_2, m)$=constant $T_{lp}=T_{mp}+\delta T$ (where $0 \leq \delta \leq 0.5$), the value $\delta$ for the scanning velocity v, denoted as $\delta(v)$, satisfies a condition $\delta(v)/T(v)$=fixed value independent of the scanning velocity v.

8. An information recording apparatus that records information on an optical information recording medium according to a mark length recording scheme in which a temporal length of a recording mark is represented as nT where n denotes a natural number and T denotes a basic clock period, said information recording apparatus comprising:

a rotation drive structure that rotates the optical information recording medium;

a laser light source that generates a light beam, which is irradiated on the optical information recording medium;

a light source drive unit that administers the laser light source to emit light; and a light emission waveform control until that controls the light source drive unit when a recording strategy relating to a light emission waveform of the light beam generated by the laser light source is set; and a speed control unit that controls a relative scanning velocity between the rotation of the optical information recording medium and the light beam irradiated on said optical information recording medium, wherein the light emission waveform control unit uses the recording strategy to form a first recording mark corresponding to a temporal length $n_1T$ when $n=n_1=2m$ (where m denotes a natural number greater than or equal to two) and form a second recording mark corresponding to a temporal length of $n_2T$ when $n=n_2=2m+1$, which first recording mark and second recording mark are formed by a multi-pulse sequence including m pulses having an irradiation power of Pw, the recording strategy being used to set an irradiation time of an $i^{th}$ pulse of the multi-pulse sequence (where i denotes a natural number within a range of one through (m−1)), which irradiation time is denoted as $T_{on}(n, i)$, to $T_{on}(n, i)$=constant $T_{mp}$ and $T_{on}(n_1, i)=T_{on}(n_2, i)$ when $n \geq 4$, and control the multi-pulse sequence such that when $n=n_2$, at least one irradiation period of the irradiation power Pw is greater than 2T, and at least one inter-pulse time width between the pulses having the irradiation power Pw when $n=n_1$ differs from at least one inter-pulse time width between the pulses having the irradiation power Pw when $n=n_2$, and when differing scanning velocities $v=v_L$ and $V=v_H$ are used in recording (where $v_L<v_H$), basic clock periods for the scanning velocities $v_L$ and $v_H$ are denoted as $T(v)=T(v_L)$ and $T(v)=T(v_H)$, respectively, and a constant line density function $v_L \times T(v_L)=v_H \times T(v_H)$ is satisfied, the light emission waveform control until controls an irradiation time upon recording at the scanning velocity $v_L$, denoted as $T_{mp}(v_L)$, and an irradiation time upon recording at the scanning velocity $v_H$, denoted as $T_{mp}(v_H)$, to satisfy conditions $T_{mp}(v_H)<T_{mp}(v_L)$ and $T_{mp}(v_H)/T(v_H)>T_{mp}(v_L)/T(v_L)$.

9. The information recording apparatus as claimed in claim 8, wherein when a minimum scanning velocity for recording is denoted as $v_0$, a basic clock period corresponding to the minimum scanning velocity $v_0$ is denoted as $T_0$, a given scanning velocity v is expressed as $v=\alpha \times v_0$ (where $\alpha$ is a real number greater than or equal to 1), and a corresponding basic clock period T is expressed as $T=T_0/\alpha$, the light emission waveform control unit controls the irradiation time $T_{mp}$ of a pulse to be a function of $\alpha$, expressed as $T_{mp}(\alpha)/T(\alpha)=a\times\alpha+b$ (where a and b are constants, $0.1 \leq a \leq 0.4$, and $0.1 \leq b \leq 0.4$).

10. The information recording apparatus as claimed in claim 8, wherein the light emission waveform control unit controls an irradiation time $T_{on}(3, 1)$ when n=3, denoted as $T_{mp}'(v)$, to satisfy conditions $T_{mp}'(v_H)<T_{mp}'(v_L)$ and $T_{mp}'(v_H)/T(v_H)>T_{mp}'(v_L)/T(v_L)$.

11. The information recording apparatus as claimed in claim 10, wherein a condition $T_{mp}'(v_H)/T_{mp}'(v_L)=T_{mp}(v_H)/T_{mp}(v_L)$ is satisfied.

12. The information recording apparatus as claimed in claim 8, wherein light with an irradiation power Pb (where Pw>Pb) is irradiated between pulses $T_{on}(n, i)$ and $T_{on}(n, i+1)$ having the irradiation power Pw, light with an irradiation power Pe (where Pw>Pe>Pb) is irradiated to record a mark space, an irradiation start time of a first pulse of the multi-pulse sequence is delayed by a deviation time $T_{d1}$ with respect to a logical recording mark start time, a final off pulse with an irradiation power Pb (where Pw>Pb) is added after irradiation of a final pulse with the irradiation power Pw of the multi-pulse sequence when $n \geq 4$, the final off pulse being switched to an irradiation power Pe (where Pw>Pe>Pb) at a time earlier than a logical data end time by a deviation time $T_{d2}$ (where $T_{d2}$ is a value independent of n and $-T \leq T_{d2} \leq T$), and the deviation times $T_{d1}$ and $T_{d2}$ for the scanning velocity v, denoted as $T_{d1}(v)$ and $T_{d2}(v)$, satisfy conditions $T_{d1}(v)/T(v)=0.5$ and $T_{d2}(v)/T(v)$=fixed value independent of the scanning velocity v.

13. The information recording apparatus as claimed in claim 12, wherein the deviation time $T_{d2}(v)$ when $n=3$, denoted as $T_{d2}'(v)$, satisfies a condition $T_{d2}'(v)/T(v)$=fixed value independent of the scanning velocity v.

14. The information recording apparatus as claimed in claim 13, wherein when an irradiation time of a final pulse of the multi-pulse sequence when $n=n_2$ is denoted as $T_{on}(n_2, m)$, and $T_{on}(n_2, m)$=constant $T_{lp}=T_{mp}+\delta T$ (where $0 \leq \delta \leq 0.5$), the value $\delta$ for the scanning velocity v, denoted as $\delta(v)$, satisfies a condition $\delta(v)/T(v)$=fixed value independent of the scanning velocity v.

\* \* \* \* \*